US011889567B2

(12) United States Patent
Zhang et al.

(10) Patent No.: US 11,889,567 B2
(45) Date of Patent: Jan. 30, 2024

(54) SLICE ALLOCATION

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/170,146

(22) Filed: Feb. 16, 2023

(65) Prior Publication Data

US 2023/0199869 A1 Jun. 22, 2023

Related U.S. Application Data

(62) Division of application No. 17/172,492, filed on Feb. 10, 2021, now Pat. No. 11,638,312.

(Continued)

(51) Int. Cl.
*H04W 76/10* (2018.01)
*H04W 40/02* (2009.01)
*H04W 24/02* (2009.01)

(52) U.S. Cl.
CPC .......... *H04W 76/10* (2018.02); *H04W 24/02* (2013.01); *H04W 40/02* (2013.01)

(58) Field of Classification Search
CPC ..... H04W 76/10; H04W 24/02; H04W 40/02; H04W 88/06; H04W 48/18; H04L 47/193; H04L 47/762

(Continued)

(56) References Cited

U.S. PATENT DOCUMENTS 9,961,624 B1\* 5/2018 Zait .......................... H04L 47/78
10,015,102 B2\* 7/2018 Giaretta ................ H04L 43/062
(Continued)

FOREIGN PATENT DOCUMENTS

CA      2217038 C      9/2001
CA      2656412 A1 \*    3/2008 ............. H04L 12/66
(Continued)

OTHER PUBLICATIONS

3gpp.org: "3rd Generation Partnership Project; Technical Specification Group Services and System Aspects; Policy and Charging Control Framework for the 5G System (5GS); Stage2 (Release 16)", 3GPP TS 23.503, V16.3.0, Dec. 31, 2019 (Dec. 31, 2019), XP051840934, pp. 1-108, 6.6.2 UE Route Selection Policy information, p. 94-p. 99 Annex A (informative): URSP rules example, p. 100-p. 103, Sections 6.1.1.2.2, 6.1.2.1, 6.1.2.2.1, 6.1.2.4, 6.2.1.3, 6.6.2.3.

(Continued)

*Primary Examiner* — Mahendra R Patel
(74) *Attorney, Agent, or Firm* — Patterson + Sheridan, L.L.P.

(57) ABSTRACT

Certain aspects of the present disclosure provide techniques for communicating, by a user equipment (UE), over multiple slices. A method that may be performed by the UE includes receiving, by a modem, from an operating system (OS), a request for route identifier, the request for route identifier comprising a traffic descriptor corresponding to a first application from which the request for route identifier originated. The method further includes transmitting a route identifier to the OS, the route identifier generated by the modem based on a routing policy that provides mapping between the traffic descriptor and a network route. The method further includes receiving, by the modem, a start network request comprising the route identifier. The method further includes establish- (Continued)

ing, in response to the start network request, a network connection via the network route.

20 Claims, 15 Drawing Sheets

Related U.S. Application Data

(60) Provisional application No. 62/976,258, filed on Feb. 13, 2020.

(58) Field of Classification Search
USPC .......................................................... 370/328
See application file for complete search history.

(56) References Cited

U.S. PATENT DOCUMENTS

| | | | |
|---|---|---|---|
| 10,602,422 B1* | 3/2020 | Jagannatha | H04L 41/5041 |
| 11,575,509 B2* | 2/2023 | Ben Henda | H04W 12/062 |
| 2005/0060414 A1* | 3/2005 | Phillips | H04L 67/1017 709/227 |
| 2007/0156919 A1* | 7/2007 | Potti | H04L 63/12 709/238 |
| 2014/0140213 A1* | 5/2014 | Raleigh | H04L 43/062 370/235 |
| 2014/0310402 A1* | 10/2014 | Giaretta | H04L 43/062 709/224 |
| 2017/0245316 A1* | 8/2017 | Salkintzis | H04W 48/18 |
| 2019/0045421 A1* | 2/2019 | Shah | H04W 40/02 |
| 2019/0053147 A1* | 2/2019 | Qiao | H04W 28/24 |
| 2019/0182875 A1* | 6/2019 | Talebi Fard | H04W 8/18 |
| 2020/0221527 A1* | 7/2020 | Bharatia | H04W 76/16 |
| 2021/0029046 A1* | 1/2021 | Mas Rosique | H04L 12/1407 |
| 2021/0136870 A1* | 5/2021 | Panchal | H04L 67/52 |
| 2021/0152615 A1* | 5/2021 | Karampatsis | H04L 65/1073 |
| 2021/0259028 A1 | 8/2021 | Zhang et al. | |

FOREIGN PATENT DOCUMENTS

| | | | | |
|---|---|---|---|---|
| CA | 2656412 | A1 | 3/2008 | |
| CA | 2786887 | A1 | 8/2010 | |
| CA | 2819643 | A1 | 6/2012 | |
| CN | 108770016 | A * | 11/2018 | ......... H04L 41/0893 |
| CN | 109429277 | A | 3/2019 | |
| CN | 109743766 | A | 5/2019 | |
| CN | 109891832 | A * | 6/2019 | ............. H04L 41/12 |
| CN | 110391926 | A * | 10/2019 | ......... H04L 41/0893 |
| EP | 3406105 | A1 | 11/2018 | |
| EP | 3522597 | A1 * | 8/2019 | ............. H04L 41/00 |
| EP | 3634041 | A1 * | 4/2020 | |
| EP | 3783848 | A1 | 2/2021 | |
| EP | 3800934 | A1 * | 4/2021 | ............ H04W 12/08 |
| JP | 4183942 | B2 | 11/2008 | |
| JP | 4183942 | B2 * | 11/2008 | ............. H04L 29/06 |
| WO | 2014168835 | | 10/2014 | |
| WO | WO-2014168835 | A2 * | 10/2014 | ............. G06F 11/34 |
| WO | WO-2017143047 | A1 * | 8/2017 | ............. H04L 41/50 |
| WO | WO-2018069852 | A1 * | 4/2018 | ............. H04W 4/50 |
| WO | 2019158063 | A1 | 8/2019 | |
| WO | 2019192692 | A1 | 10/2019 | |
| WO | WO-2019192692 | A1 * | 10/2019 | ......... H04L 65/1006 |
| WO | 2019214300 | A1 | 11/2019 | |
| WO | WO-2019214300 | A1 * | 11/2019 | ............. H04L 45/00 |
| WO | 2020064125 | A1 | 4/2020 | |
| WO | WO-2020064125 | A1 * | 4/2020 | ............ H04W 48/18 |
| WO | WO-2020103654 | A1 * | 5/2020 | ......... H04L 45/306 |
| WO | WO-2021089160 | A1 * | 5/2021 | ......... H04L 41/5003 |

OTHER PUBLICATIONS

International Preliminary Report on Patentability—PCT/US2021/017567 The International Bureau of WIPO—Geneva, Switzerland, dated Aug. 25, 2022.

International Search Report and Written Opinion—PCT/US2021/017567—ISA/EPO—dated Oct. 4, 2021.

Motorola Mobility, et al., "Update to Solution 8—Routing Media Traffic via Different 5g Network Slices", SA WG2 Meeting #127, S2-1844457, Apr. 16-Apr. 20, 2018, Sanya, China, (Apr. 21, 2018), pp. 1-12, XP051432823, Retrieved from the Internet: URL: http://www.3gpp.org/ftp/Meetings%5F3GPP%5FSYNC/SA2/Docs/. [retrieved on Apr. 19, 2018] the whole document.

Partial International Search Report—PCT/US2021/017567—ISA/EPO—dated Jul. 5, 2021.

* cited by examiner

SLICE ALLOCATION

CROSS-REFERENCE TO RELATED APPLICATIONS

This application claims divisional application of U.S. Non Provisional patent application Ser. No. 17/172,492, filed Feb. 10, 2021, which claims benefit of and priority to U.S. Provisional Application No. 62/976,258, filed Feb. 13, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for providing wireless communication using multiple slices on a single user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved wireless communication.

Certain aspects are directed to a method for wireless communication at a user equipment (UE). In some examples, the method includes transmitting, from an operating system (OS) to a modem, an indication of a start network request originating from an application, the transmitting of the indication based on a determination that a traffic descriptor associated with the application is a non-default descriptor. In some examples, the method includes determining one or more parameters for establishing a new network connection for the application, the one or more parameters determined based on a routing policy that provides mapping between the traffic descriptor and the one or more parameters. In some examples, the method includes transmitting, to the application, an indication that the new network connection has been established based on the one or more parameters.

Certain aspects are directed to an apparatus for wireless communication. In some examples, the UE includes a memory and a processor coupled to the memory. In some examples, the memory and the processor are configured to transmit, from an operating system (OS) to a modem, an indication of a start network request originating from an application, wherein the indication is based on a determination that a traffic descriptor associated with the application is a non-default descriptor. In some examples, the memory and the processor are configured to determine one or more parameters for establishing a new network connection for the application, the one or more parameters determined based on a routing policy that provides mapping between the traffic descriptor and the one or more parameters. In some examples, the memory and the processor are configured to transmit, to the application, an indication that the new network connection has been established based on the one or more parameters.

Certain aspects are directed to an apparatus for wireless communication. In some examples, the apparatus includes means for transmitting, from an operating system (OS) to a modem, an indication of a start network request originating from an application, wherein the indication is based on a determination that a traffic descriptor associated with the application is a non-default descriptor. In some examples, the apparatus includes means for determining one or more parameters for establishing a new network connection for the application, the one or more parameters determined based on a routing policy that provides mapping between the traffic descriptor and the one or more parameters. In some examples, the apparatus includes means for transmitting, to the application, an indication that the new network connection has been established based on the one or more parameters.

Certain aspects are directed to a non-transitory computer-readable medium having instructions stored thereon that, when executed by a first wireless device, cause the first wireless device to perform operations. In some examples, the operations include transmitting, from an operating system (OS) to a modem, an indication of a start network request originating from an application, the transmitting of the indication based on a determination that a traffic descriptor associated with the application is a non-default descriptor. In some examples, the operations include determining one or more parameters for establishing a new network connection for the application, the one or more parameters determined based on a routing policy that provides mapping between the traffic descriptor and the one or more parameters. In some examples, the operations include transmitting, to the application, an indication that the new network connection has been established based on the one or more parameters.

Certain aspects are directed to a method for wireless communication at a user equipment (UE). In some examples, the method includes transmitting, from an operating system (OS) to a modem, an indication of a request to establish a network connection originating from an application, the request comprising a traffic descriptor associated with the network connection, the traffic descriptor provided by the application. In some examples, the method includes transmitting, to the application, an indication that the network connection is established.

Certain aspects are directed to an apparatus for wireless communication. The apparatus includes a processor and a memory coupled to the processor. In some examples, the memory and the processor are configured to transmit, from an operating system (OS) to a modem, an indication of a request to establish a network connection originating from an application, the request comprising a traffic descriptor associated with the network connection, the traffic descriptor provided by the application. In some examples, the memory and the processor are configured to transmit, to the application, an indication that the network connection is established.

Certain aspects are directed to an apparatus for wireless communication. In some examples, the apparatus includes means for transmitting, from an operating system (OS) to a modem, an indication of a request to establish a network connection originating from an application, the request comprising a traffic descriptor associated with the network connection, the traffic descriptor provided by the application. In some examples, the apparatus includes means for transmitting, to the application, an indication that the network connection is established.

Certain aspects are directed to a non-transitory computer-readable medium having instructions stored thereon that, when executed by a first wireless device, cause the first wireless device to perform operations. In some examples, the operations include transmitting, from an operating system (OS) to a modem, an indication of a request to establish a network connection originating from an application, the request comprising a traffic descriptor associated with the network connection, the traffic descriptor provided by the application. In some examples, the operations include transmitting, to the application, an indication that the network connection is established.

Certain aspects are directed to a method for wireless communication at a user equipment (UE). In some examples, the method includes receiving, by a modem, from an operating system (OS), a request for route identifier, the request for route identifier comprising a traffic descriptor corresponding to a first application from which the request for route identifier originated. In some examples, the method includes transmitting a route identifier to the OS, the route identifier generated by a modem based on a routing policy that provides mapping between the traffic descriptor and a network route. In some examples, the method includes receiving, by the modem, a start network request comprising the route identifier. In some examples, the method includes establishing, in response to the start network request, a network connection via the network route.

Certain aspects are directed to an apparatus for wireless communication. In some examples, the apparatus includes a processor, a modem, and a memory coupled to the processor. In some examples, the processor and the memory are configured to receive, by the modem, from an operating system (OS), a request for route identifier, the request for route identifier comprising a traffic descriptor corresponding to a first application from which the request for route identifier originated. In some examples, the processor and the memory are configured to transmit a route identifier to the OS, the route identifier generated by a modem based on a routing policy that provides mapping between the traffic descriptor and a network route. In some examples, the processor and the memory are configured to receive, by the modem, a start network request comprising the route identifier. In some examples, the processor and the memory are configured to establish, in response to the start network request, a network connection via the network route.

Certain aspects are directed to an apparatus for wireless communication. In some examples, the apparatus includes means for receiving, by a modem, from an operating system (OS), a request for route identifier, the request for route identifier comprising a traffic descriptor corresponding to a first application from which the request for route identifier originated. In some examples, the apparatus includes means for transmitting a route identifier to the OS, the route identifier generated by a modem based on a routing policy that provides mapping between the traffic descriptor and a network route. In some examples, the apparatus includes means for receiving, by the modem, a start network request comprising the route identifier. In some examples, the apparatus includes means for establishing, in response to the start network request, a network connection via the network route.

A non-transitory computer-readable medium having instructions stored thereon that, when executed by a first wireless device, cause the first wireless device to perform operations. In some examples, the operations include receiving, by a modem, from an operating system (OS), a request for route identifier, the request for route identifier comprising a traffic descriptor corresponding to a first application from which the request for route identifier originated. In some examples, the operations include transmitting a route identifier to the OS, the route identifier generated by a modem based on a routing policy that provides mapping between the traffic descriptor and a network route. In some examples, the operations include receiving, by the modem, a start network request comprising the route identifier. In some examples, the operations include establishing, in response to the start network request, a network connection via the network route.

Certain aspects of the subject matter described in this disclosure can be implemented in a method for wireless communication by a user equipment (UE). The method may include storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN. The method may also include executing, by one or more processors, an operating system and one or more applications including an application. In some examples, the application is configured to send a request for a route identifier to the operating system. In some examples, the operating system, based on receiving the request for the route identifier, is configured to send the request for the route identifier to the modem with an application identifier associated with the application. In some examples, the modem, based on receiving the request for the route identifier with the application identifier, is configured to generate the route identifier and associate the route identifier with the second traffic descriptor. In some examples, the modem is configured to send the route identifier to the operating system. In some examples, the operating system, based on receiving the route identifier, is configured to send the route identifier to the application. In some examples, the application is configured to send a request to bring up an interface to the operating system, the request to bring up the interface including the route identifier. In some examples, the operating system, based on receiving the request to bring up the interface, is configured to determine if the interface is already up based on the route identifier. In some examples, when the operating system determines the interface is already up, the operating system is configured to send an identifier of the interface to the application. In some examples, when the operating system determines the interface is not already up: the operating system is configured to send a start network command to the modem, the start network command including the route identifier. In some examples, the modem, based on receiving the start network command, is configured to determine the first DNN and the second slice as associated with the route identifier based on the route selection policy and establish a protocol data unit (PDU) session associated with the first DNN and the second slice. In some examples, the modem is configured to send to the operating system an indication of the PDU session establishment. In some examples, the operating system, based on receiving the indication of the PDU session establishment, is configured to set an interface status as up and associated with the route identifier. In some examples, the operating system is configured to send the identifier of the interface to the application. In some examples, the application is configured to utilize the interface for communication.

Certain aspects of the subject matter described in this disclosure can be implemented in a method for wireless communication by a user equipment (UE). The method may include storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default traffic descriptor for the first DNN. In certain aspects, one or more processors configured to execute an operating system and one or more applications including an application, wherein: the modem is configured to indicate any non-default traffic descriptors, including the second traffic descriptor, to the operating system. In some examples, the application is configured to send a request to bring up an interface to the operating system, the operating system is configured to, based on receiving the request to bring up the interface, determine if a traffic descriptor associated with the application is a non-default traffic descriptor indicated by the modem. In some examples, when the traffic descriptor is not a non-default traffic descriptor, the operating system is configured to indicate a first interface associated with default traffic descriptor to the application based on the request to bring up the interface, and the application is configured to utilize the first interface for communication. In some examples, when the traffic descriptor is a non-default traffic descriptor and is the second traffic descriptor: the operating system is configured to send a route lookup to the modem, the route lookup including the second traffic descriptor. In some examples, the modem is configured to, based on receiving the route lookup, indicate a new interface is needed to the operating system based on the second traffic descriptor being a non-default traffic descriptor. In some examples, the operating system is configured to pick a second interface to perform the request to bring up the interface. In some examples, the operating system is configured to send a start network command to the modem, the start network command including the second traffic descriptor. In some examples, the modem, based on receiving the start network command, is configured to determine the first DNN and the second slice as associated with the second traffic descriptor based on the route selection policy and establish a protocol data unit (PDU) session associated with the first DNN and the second slice. In some examples, the modem is configured to send to the operating system an indication of the PDU session establishment including an identifier of the first DNN and an identifier of the second slice. In some examples, the operating system, based on receiving the indication of the PDU session establishment, is configured to set a second interface status as up and associated with the first DNN and the second slice. In some examples, the operating system is configured to send an identifier of the second interface to the application. In some examples, the application is configured to utilize the second interface for communication.

Certain aspects of the subject matter described in this disclosure can be implemented in a method for wireless communication by a user equipment (UE). In some examples, the method includes a modem configured to store a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN. In some examples, the method includes one or more processors configured to execute an operating system and one or more applications including an application. In some examples, the application is configured to send a request to bring up an interface to the operating system, the request to bring up the interface including a specifier indicating the first DNN and the second slice. In some examples, the operating system is configured to determine if the request to bring up the interface includes any specifier. In some examples, the operating system is configured to, based on the request to bring up the interface including the specifier, send a start network command to the modem, the start network command including the specifier. In some examples, the modem is configured to, based on receiving the start network command including the specifier, check if the route selection policy includes a traffic descriptor associated with both the first DNN and the second slice. In some examples, the modem is configured to, based on the route selection policy including the second traffic descriptor associated with both the first DNN and the second slice, establish a protocol data unit (PDU) session associated with the first DNN and the second slice. In some examples, the modem is configured to send to the operating system an indication of the PDU session establishment. In some examples, the operating system, based on receiving the indication of the PDU session establishment, is configured to set an interface status as up and associated with the specifier. In some examples, the operating system is configured to send the identifier of the interface to the application. In some examples, the application is configured to utilize the interface for communication.

Aspects of the present disclosure provide means for, apparatus, processors, and computer-readable mediums for performing techniques and methods that may be complementary to the operations by the UE described herein, for example, by a BS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligent (AI) enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
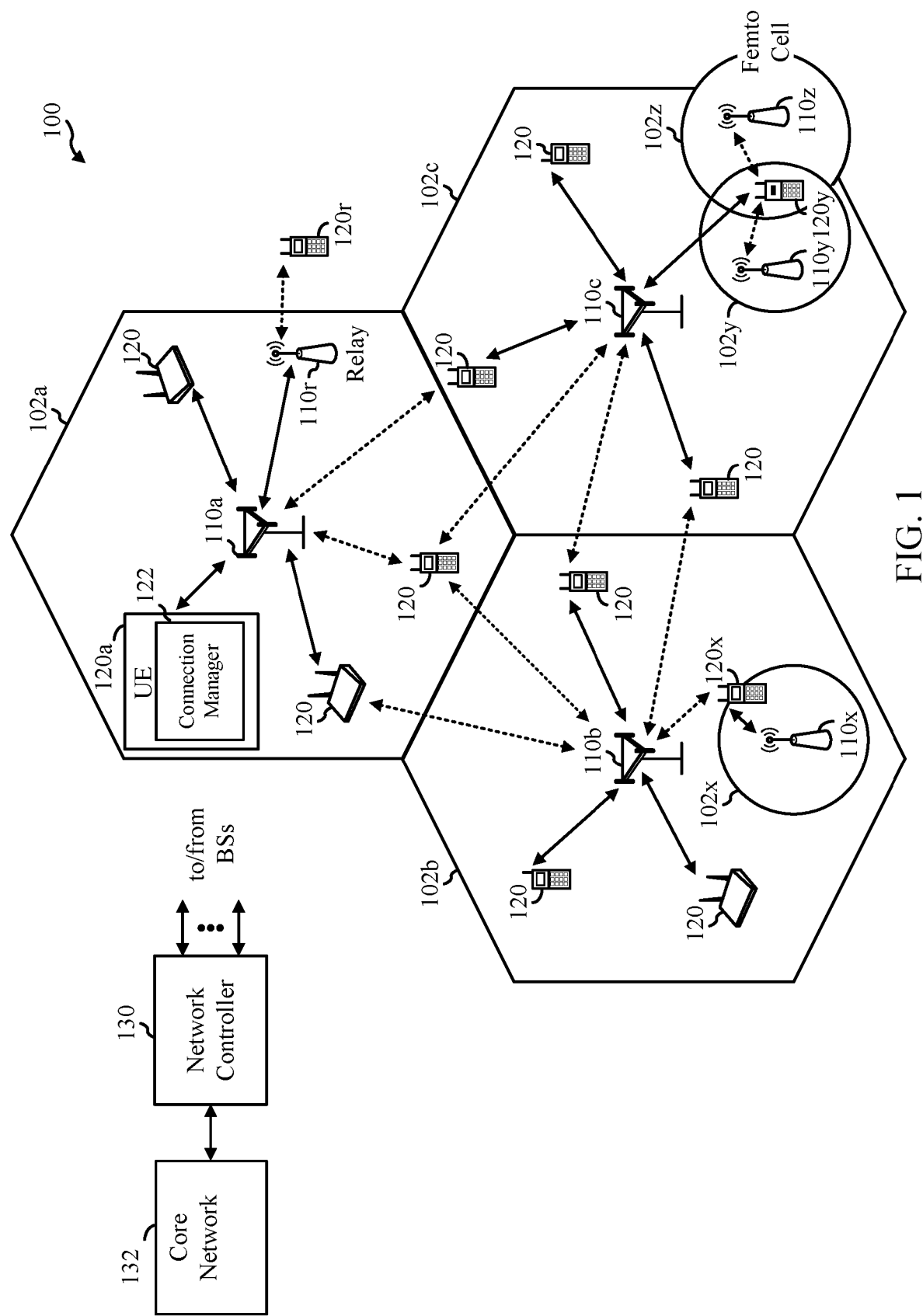
FIG. 1 is a block diagram conceptually illustrating an example telecommunications system, in accordance with certain aspects of the present disclosure.

Aspects of the present disclosure provide apparatus, methods, processing systems, and computer readable mediums for configuring a modem to provide slicing, such as application-level slicing, and providing a user equipment (UE) with the capability to communicate over multi-slices.

The following description provides examples of communicating over multiple slices in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 mega-hertz (MHz) or beyond), millimeter wave (mmW) targeting high carrier frequency (e.g., 25 giga-hertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed, for example, enabling application-based slice allocation in a multi-slice NR network. In some cases, the network 100 may be a multi-slice network, wherein each slice defines as a composition of adequately configured network functions, network applications, and underlying cloud infrastructures that are bundled together to meet the requirement of a specific use case or business model. For example, slices may include an enhanced mobile broadband (eMBB) slice, an ultra-low latency communication (URLLC) slice, a massive Internet of things (mIoT) or massive machine-type communications (mMTC) slice, and any other suitable services.

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. A network controller 130 may couple to a set of BSs 110 and provide coordination and control for these BSs 110 (e.g., via a backhaul).

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

According to certain aspects, the UEs 120 may be configured for communicating over multiple slices. For example, multiple applications executing on the UE 120 may each require a different slice for communication with a network. As shown in FIG. 1, the UE 120a includes a connection manager 122. In certain aspects, the connection manager 122 may be configured to transmit, from an operating system (OS) to a modem of the UE 120, an indication of a start network request originating from an application executing on the OS. The transmission of the indication may be based on a determination that a traffic descriptor associated with the application is a non-default descriptor. In certain aspects, the connection manager 122 may determine one or more parameters for establishing a new network connection for the application, the one or more parameters determined based on a routing policy that provides mapping between the traffic descriptor and the one or more parameters. In certain aspects, connection manager 122 may transmit, to the application, an indication that the new network connection has been established based on the one or more parameters.

In certain aspects, connection manager 122 may be configured to transmit, from an operating system (OS) to a modem, an indication of a request to establish a network connection originating from an application, the request comprising a traffic descriptor associated with the network connection, the traffic descriptor provided by the application. In certain aspects, connection manager 122 may be configured to transmit, to the application, an indication that the network connection is established.

In certain aspects, a modem (e.g., modem 254 of FIG. 2, modem 308 of FIGS. 6-9) may be configured to receive, from an operating system (OS), a request for route identifier, the request for route identifier comprising a traffic descriptor corresponding to a first application from which the request for route identifier originated. In certain aspects, the modem may be configured to transmit a route identifier to the OS, the route identifier generated by the modem based on a routing policy that provides mapping between the traffic descriptor and a network route. In certain aspects, the modem is configured to receive a start network request comprising the route identifier. In certain aspects, the modem is configured to establish, in response to the start network request, a network connection via the network route.

In certain aspects, the modem is configured to store a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default traffic descriptor for the first DNN, in accordance with aspects of the present disclosure. In some examples, the connection manager 122 may execute, by one or more processors, an operating system and one or more applications including an application.

Figure 2:
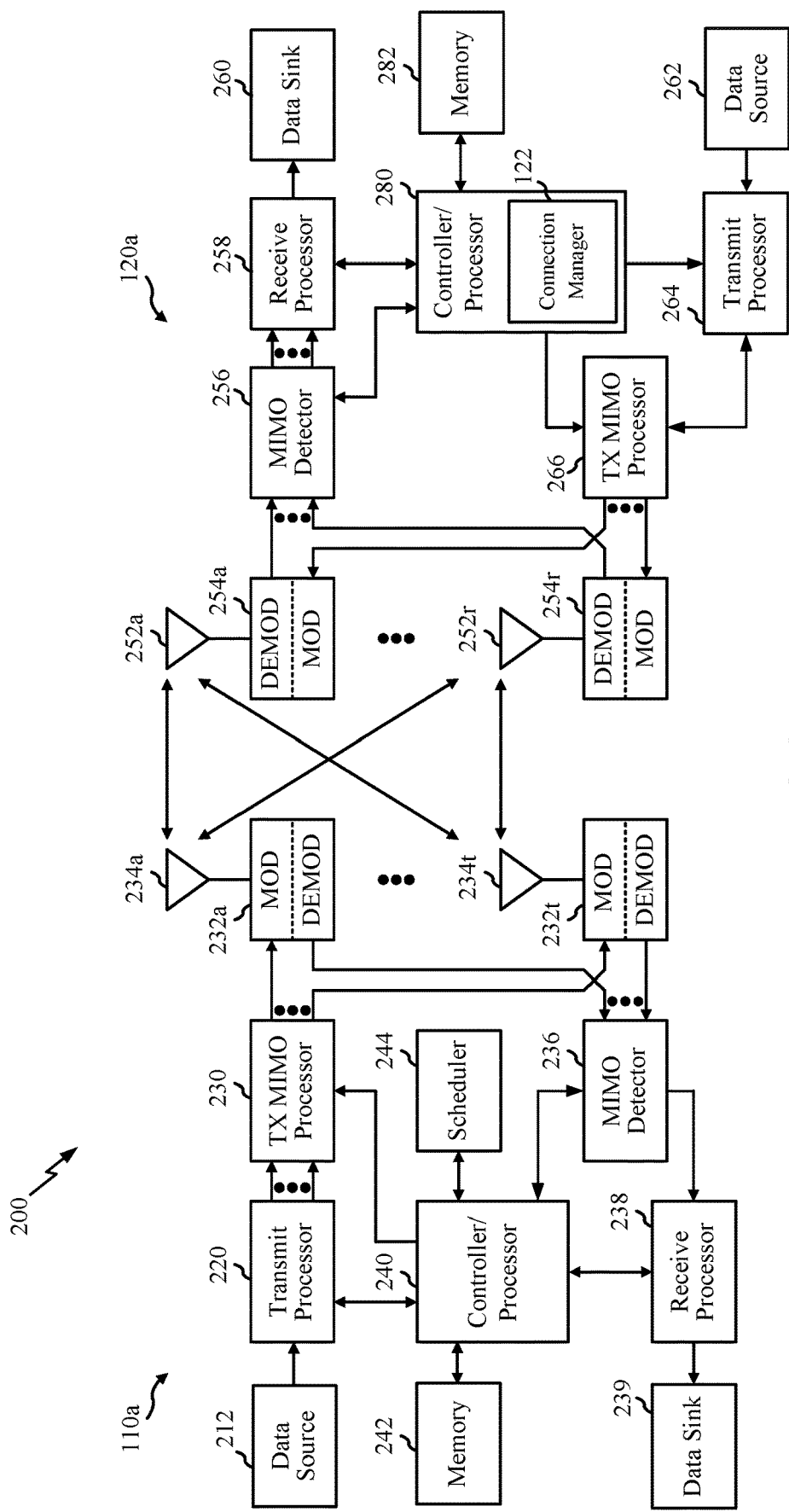
FIG. 2 is a block diagram conceptually illustrating a design of an example a base station (BS) and user equipment (UE), in accordance with certain aspects of the present disclosure.

FIG. 2 illustrates example components 200 of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARM) indicator channel (PHICH), physical downlink control channel (PDCCH), group common (GC) PDCCH, etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280. In some examples, demodulators 254a-254r are configured to function as modems.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has the connection manager 122. In some examples, the connection manager 122 may be executed on a high level operating system (HLOS) running on a controller/processor. In some examples, one or more applications may execute on top of the HLOS.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a sub-band may cover multiple RBs. NR may support a base subcarrier spacing (SCS) of 15 kilo-hertz (KHz) and other SCS may be defined with respect to the base SCS (e.g., 30 kHz, 60 kHz, 120 kHz, 240 kHz, etc.).

Example Method for Establishing a Slice Per UE

Figure 3:
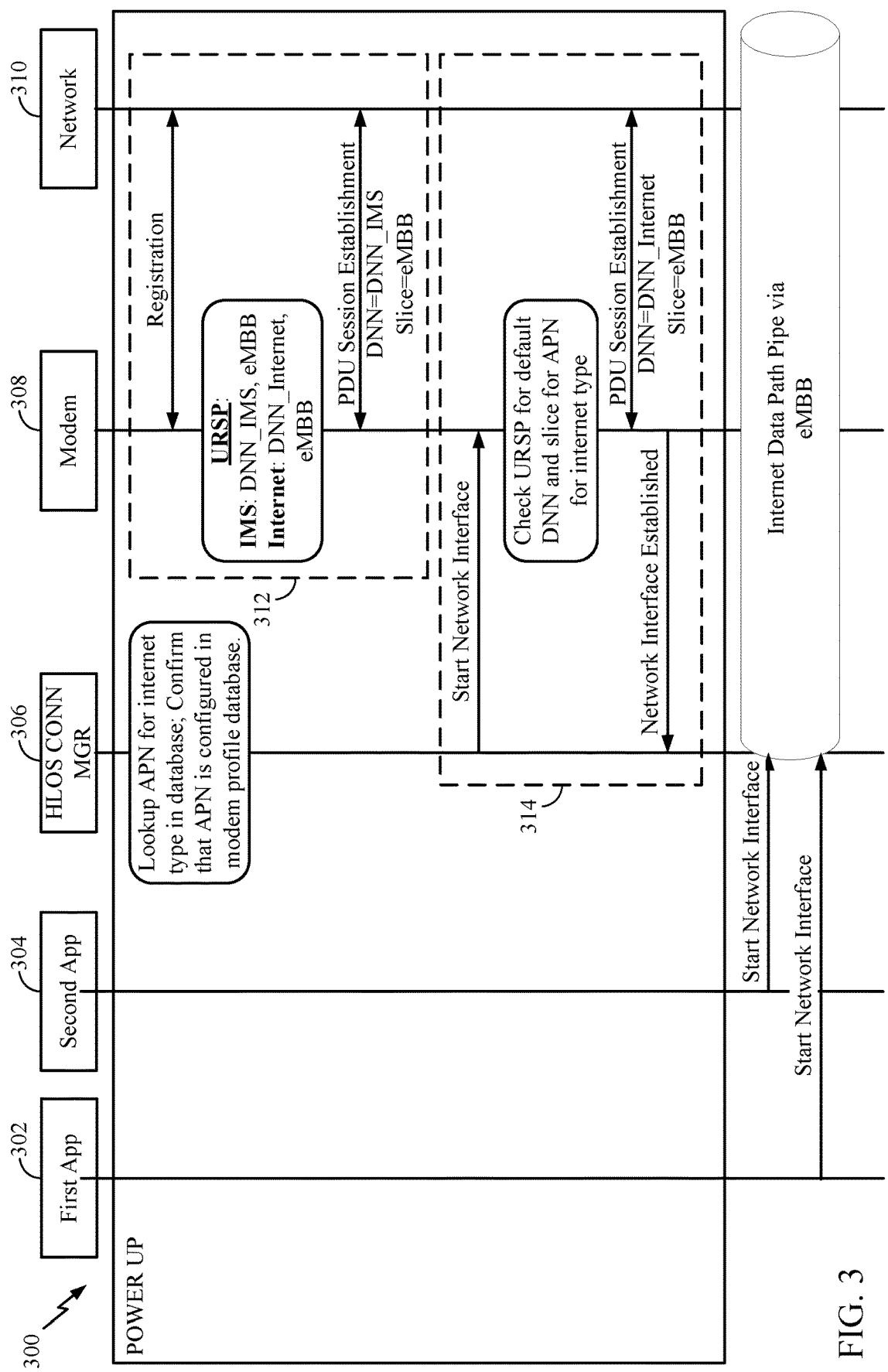
FIG. 3 is a call-flow diagram illustrating example signaling for establishing a slice over which applications on a UE can communicate, in accordance with certain aspects of the present disclosure.

FIG. 3 is a call flow diagram illustrating example signaling 300 for establishing multiple slices over which applications (apps) on a UE (e.g., UE 120a of FIGS. 1 and 2) can communicate. In this example, the UE 120a includes a controller/processor (e.g., controller/processor 280 of FIG. 2) and a modem 308 (e.g., modem 254 of FIG. 2). The controller processor 280 supports a high-level operating system (HLOS) upon which multiple applications (e.g., a first app 302 and a second app 304) execute. In some examples, the HLOS includes a connection manager 306, which may be any suitable operating system component capable of communication between the applications (302 and 304) and the modem 308. The modem 308 may be configured to communicate between a network 310 (e.g., BS 110a of FIGS. 1 and 2) and the HLOS connection manager 306.

The first application 302 and the second application 304 on the UE 120a may communicate with the network 310 via the HLOS connection manager 306 and the modem 308. In some examples, the modem 308 is configured to identify an app which is the source/destination of a data packet. For example, the association between the data packet and the application may be identified by having the HLOS pass an app identifier, or app ID (e.g., APP_1 for the first app 302, and APP_2 for the second app 304) of the application along with the data packet. Each data packet may be tagged with the identifier. That is, the data packet may be communicated from the HLOS to the modem along with an identifier (e.g., a tag) as an auxiliary data field which associates the data packet with the application.

Initially, upon power up of the UE 120a, there is no connected interface between the UE 120a and the network 310. Accordingly, the modem 308 and the network 310 perform a modem initialization 312 wherein a registration is performed between the modem 308 and the network 310. In an HLOS internet establishment 314, the HLOS connection manager 306 and the modem communicate to establish a connection interface between the UE 120a and the network 310. Prior to performing the HLOS internet establishment 314, the HLOS connection manager 306 may look up an access point name (APN) for an Internet type connection, wherein the APN is stored in a database maintained by the HLOS connection manager 306. The HLOS connection manager 306 may then confirm that the APN is configured in a modem profile database maintained by the modem 308.

In some embodiments, the modem 308 does not establish an internet connection to facilitate internet communication between the modem 308 and the network 310 at the modem initialization 312. As such, in the HLOS internet establishment 314, the HLOS connection manager 306 requests that the modem 308 start an internet interface with the network 310. Upon receiving the request, the modem 308 may check a UE route selection policy (URSP) received from the network 310 during the modem initialization 312 to determine a data network name (DNN) and slice for the Internet type connection with the APN. The URSP provides the modem with default slice for the Internet type connection with the APN. The modem 308 can then establish a protocol data unit (PDU) session with the network 310 to establish the Internet type connection using the eMBB slice. Once the PDU session is established, the modem 308 may notify the HLOS connection manager 306 that the session is established.

Once the network internet interface is established during the HLOS internet establishment 314, an internet data path pipe is established between the HLOS connection manager 306, the modem 308, and the network 310. Thus, the first application 302 and the second application 304 can begin to use the internet data path pipe to communicate data between the applications and the network 310.

As such, one slice may be used for the each UE 120a, or alternatively, one slice for each DNN of the UE 120a. For example, a single UE 120a may use multiple DNNs (e.g., an admin data network, an internet data network, an IP multimedia system (IMS) data network, etc.), wherein each of the multiple DNNs use the same slice (e.g., eMBB slice).

However, certain applications on a UE 120a may desire to use a different slice for a DNN such as the Internet, such as URLLC, which may not function correctly if the UE 120a can only be configured to use a single eMBB slice for the Internet. As such, it would be advantageous to provide the UE 120a with the ability to use multiple slices. In some examples, it would be advantageous if the UE 120a had the ability to establish connections over multiple slices with a single DNN.

Example Methods for Establishing Multiple Slices Per UE

Figure 4:
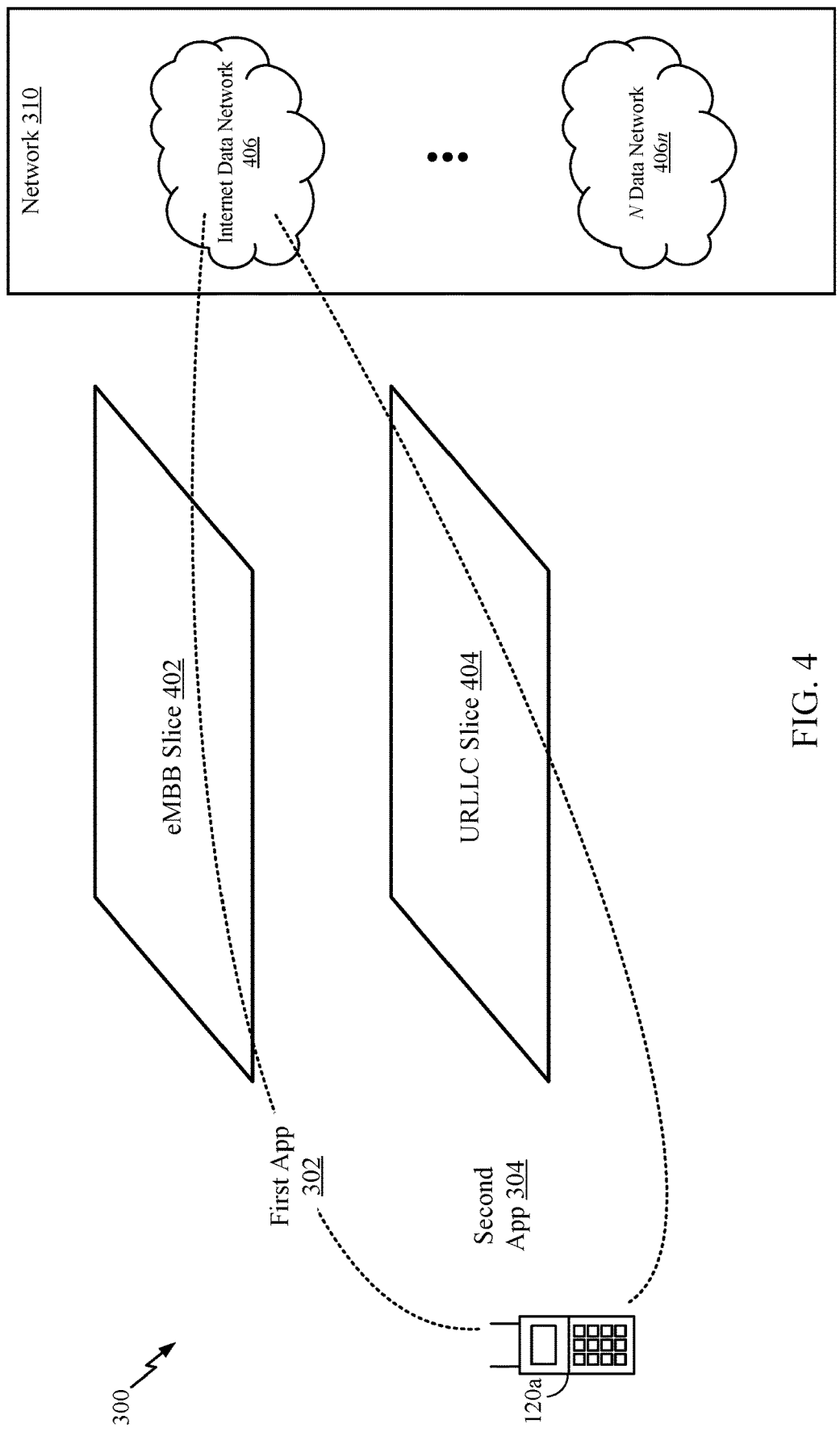
FIG. 4 is a conceptual diagram illustrating a scenario where communication to a same DNN occurs over two different slices, according to certain aspects disclosed herein.

FIG. 4 is a conceptual diagram illustrating a scenario where communication to a same DNN occurs over two different slices (e.g., an eMBB slice 402 and a URLLC slice 404), according to certain aspects disclosed herein. The UE 120a may include multiple applications (e.g., first app 302 and second app 304 of FIG. 3). The UE 120a may be configured to communicate data with a network (e.g., network 310 of FIG. 3), wherein the network may include N data networks, (e.g., a first DNN "internet data network" 406 through "N" DNN 406n) where N is a non-zero integer. Here, the first app 302 is configured to communicate over the eMBB slice 402 with the internet data network 406

DNN, such as based on a first traffic descriptor (e.g., default used for Internet communication) that is specified in the URSP of the UE 120*a*. On the other hand, the second app 304 is configured to communicate over the URLLC slice 404 with the internet data network 406 DNN based on a second traffic descriptor of the second app 304 that is specified in the URSP.

That is, the URSP policy indicates that by default apps such as the first app 302 should be communicatively connected to the first DNN via the eMBB slice 402, while the second app 304, which has a specific traffic descriptor in a universal route selection policy (USRP) that supersedes a default policy, should be communicatively connected to the first DNN via the URLLC slice 404.

Figure 5:
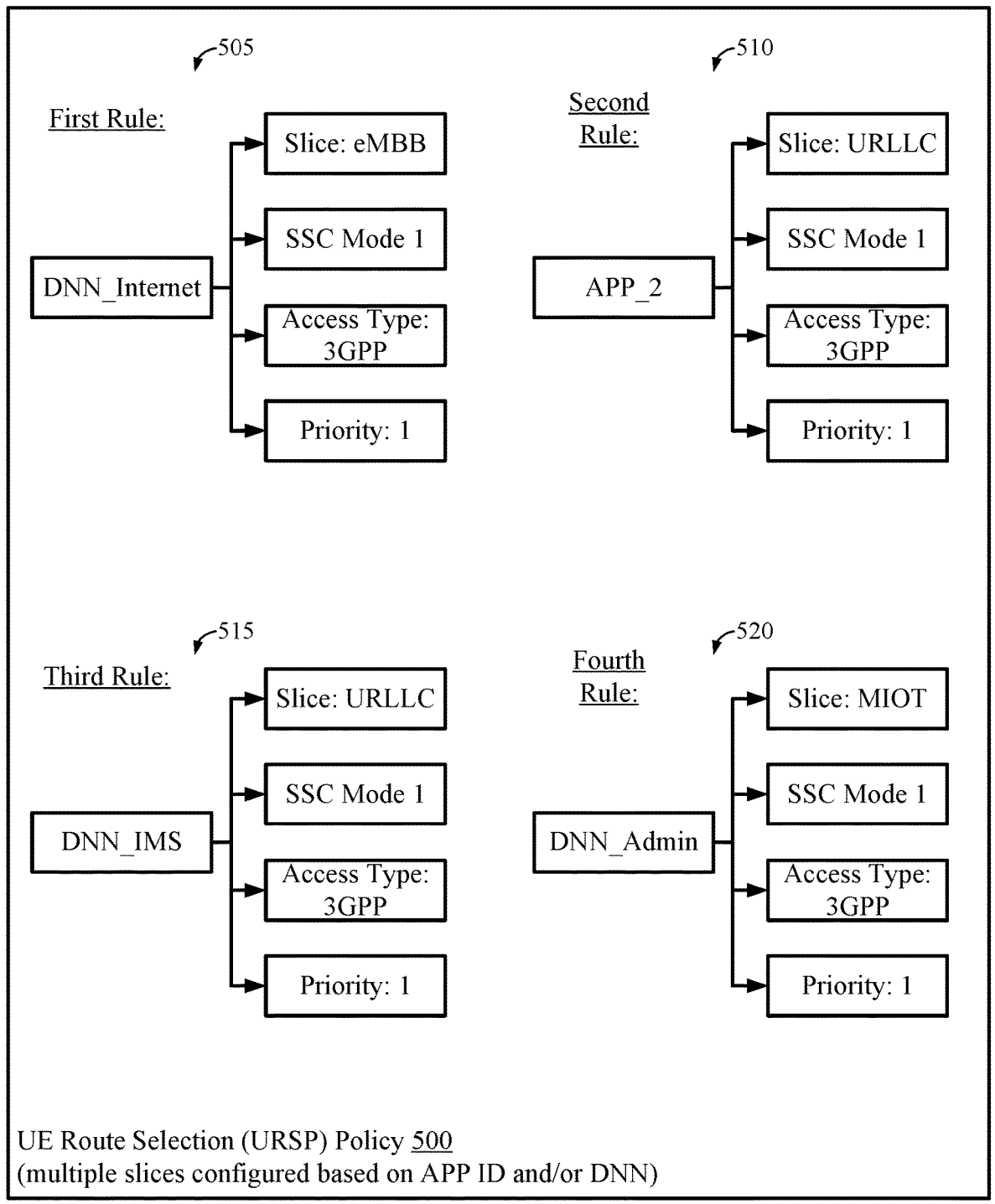
FIG. 5 is a conceptual illustration of a UE route selection policy (URSP) configuration for supporting the communication scenario illustrated in FIG. 4, according to certain aspects disclosed herein.

FIG. 5 is a conceptual illustration of a URSP configuration 500 for supporting the communication scenario illustrated in FIG. 4. The URSP configuration 500 may include multiple rules indexed by a traffic descriptor. For example, a first rule 505 may be indexed by traffic descriptor "DNN_Internet." A second rule 510 may be indexed by traffic descriptor "APP_2." A third rule 515 may be indexed by traffic descriptor "DNN_IMS," and a fourth rule 520 may be indexed by traffic descriptor "DNN_Admin." As shown, each rule may include one or more of a corresponding slice, a corresponding session and service continuity (SSC) mode, an access type, and/or a priority. Additional identifiers, modes, types, etc. may also be added to the rules without departing from the novel features disclosed herein.

In this example, the traffic descriptor for each of the first rule 505, the third rule 515, and the fourth rule 520 may be a particular DNN. For example, the traffic descriptor for the first rule 505 may be an Internet DNN, the traffic descriptor for the third rule 515 may be in IMS DNN, and the traffic descriptor for the fourth rule 520 may be an administrator DNN. These traffic descriptors may serve as defaults for communication over the corresponding DNN. In contrast, the traffic descriptor for the second rule 510 may be an APN, an app ID, or any other suitable identifier associated with, for example, second app 304.

Figure 6:
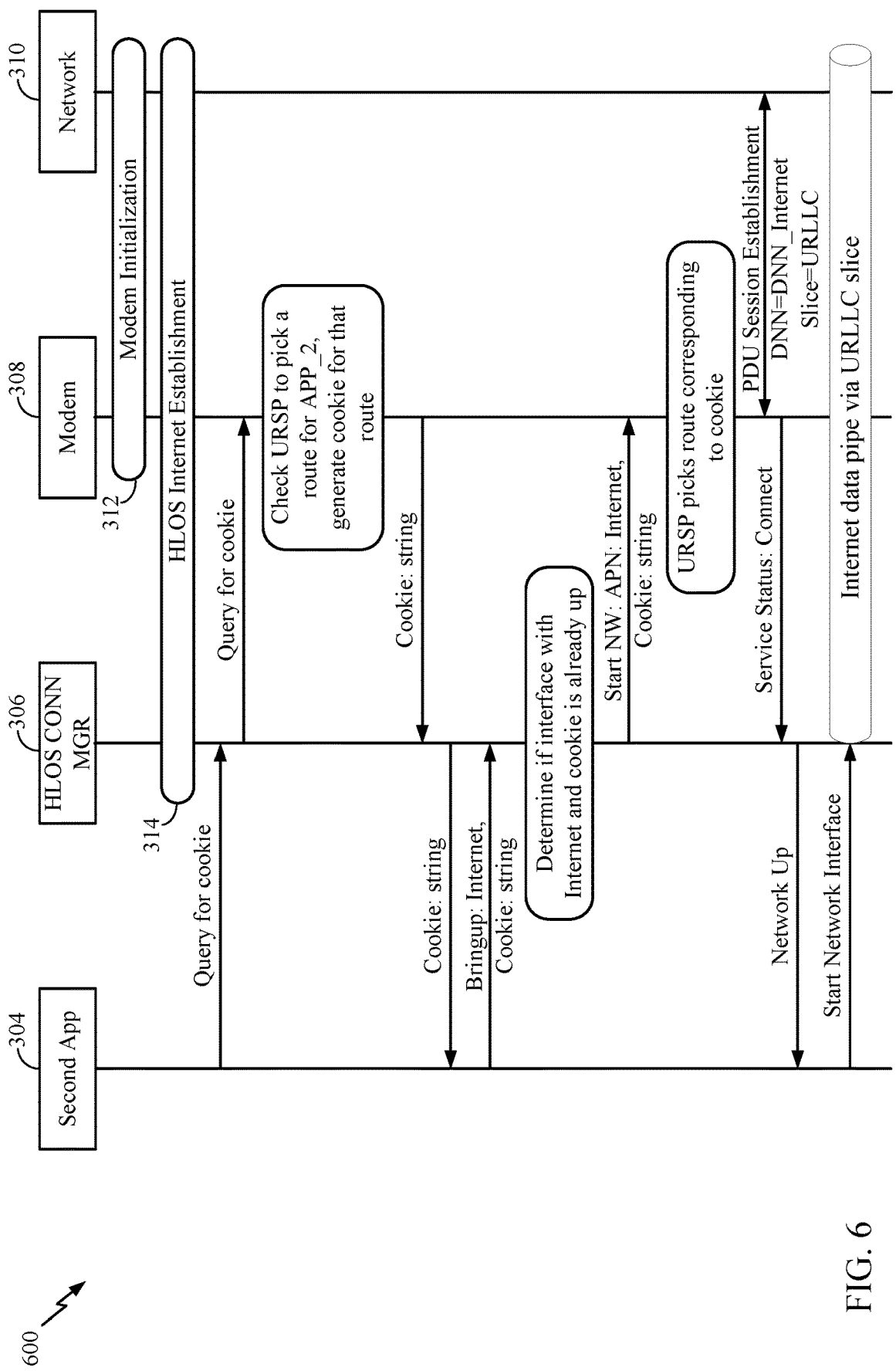
FIG. 6 is a call-flow diagram illustrating a first example method for establishing multi-slice communication between a UE and a network, according to certain aspects disclosed herein.

FIG. 6 is a call flow diagram 600 illustrating a first example method for establishing multi-slice communication between a UE 120*a* and a network 310. In accordance with various aspects of the disclosure, an element of FIG. 6, or any portion of an element, or any combination of elements may be implemented with the controller/processor 280 and/or modem 254 of FIG. 2 that includes one or more processors.

At the outset, the modem initialization 312 and the HLOS internet establishment 314 may be the same as shown in FIG. 3 as described above, wherein an internet data path pipe via eMBB (not shown) is established. In some examples, the second app 304 is configured to request a route identifier, also referred to as a cookie, from the HLOS connection manager 306.

The HLOS connection manager 306 may determine that the request is from second app 304, and determine a traffic descriptor, such as app ID APP_2 of the second app 304, and pass the request along with the traffic descriptor to the modem 308, which may then determine a route (e.g., an internet data pipe via URLLC slice) for the second app 304, and generate a cookie (e.g., a string, such as a random string, hash, etc. of one or more values) for the second app 304. For example, the modem 308, based on the URSP configuration 500, associates the traffic descriptor APP_2 sent with the request, with second rule 510, and thus slice URLLC. The modem 308 then associates the cookie with the determined route. The modem 308 may then provide the HLOS connection manager 306 with the cookie that provides a mapping to the determined route, such as in a database maintained by the modem 308. In some examples, the database may index each route stored on the database according to a corresponding cookie. The HLOS connection manager 306 provides the cookie to the second app 304. It should be noted that in certain aspects, since the cookie may be a random string, only the modem may specifically know which route maps with which cookie, and HLOS connection manager 306 and/or second app 304 do not need to have such knowledge or ability to make such a determination.

Next, the second application 304 may bring up an interface to the network 310 via the route associated with the cookie, and thus via the URLLC slice. In some examples, the second application 304 may communicate a bring-up command along with the cookie to HLOS connection manager 306 to bring up the route. In certain aspects, such as to maintain consistency with legacy functions, the second application 304 may also communicate the DNN for the route along with the bring-up command.

The HLOS connection manager 306 may then determine if there is already an interface associated with the cookie (e.g., and DNN) requested by the second app 304. If there is already an interface, then the HLOS connection manager 306 will map the second app 304 to the existing interface.

However, if there is no existing interface, the HLOS connection manager 306 will communicate a start network (e.g., "start NW") request to the modem 308 that includes the cookie (e.g., and the DNN). When the request is received, the modem 308 will respond by looking up the route (i.e., that is over URLLC in this case) associated with the cookie (e.g., and the identified data network), and setting up a PDU session for the route. Once modem 308 determines that the PDU session is established, the modem 308 may notify the HLOS connection manager 306 that the requested interface via the route is established. The HLOS connection manager 306 may then proceed to notify the second app 304 that the network is up. The second app 304 may then proceed to communicate with the network 310 over the URLLC slice. Thus, at this point, there are two interfaces established between the UE 120*a* and the internet DNN for network 310: an internet data path pipe via the eMBB slice (default), and an internet data path pipe via the URLLC slice (e.g., associated with the cookie).

Although the examples provided herein relate to a request by the second app 304 that includes both a cookie and an identification of the data network, it is appreciated that the second app 304 may instead provide the request with only the cookie.

The modem 308 may then communicate a "connected" service status to the second app 304 via the HLOS connection manager 306, and the second app 304 may begin communications over the internet data pipe via the URLLC slice.

It should be noted that, in the example described above, and in reference to FIG. 6, in some examples, the cookie string generated by the modem 308 is a random string. In some examples, the app ID may include one of an application identifier of the application or a remote Internet protocol (IP) address associated with the application. Moreover, to the extent that the foregoing examples relate to eMBB and URLLC slices, it is appreciated that these slices may include any other services, including MIoT; and to the extent that the data network described in the foregoing is an Internet data network, any other suitable data network or service may be used (e.g., administrative data network IMS data network, etc.).

Figure 7:
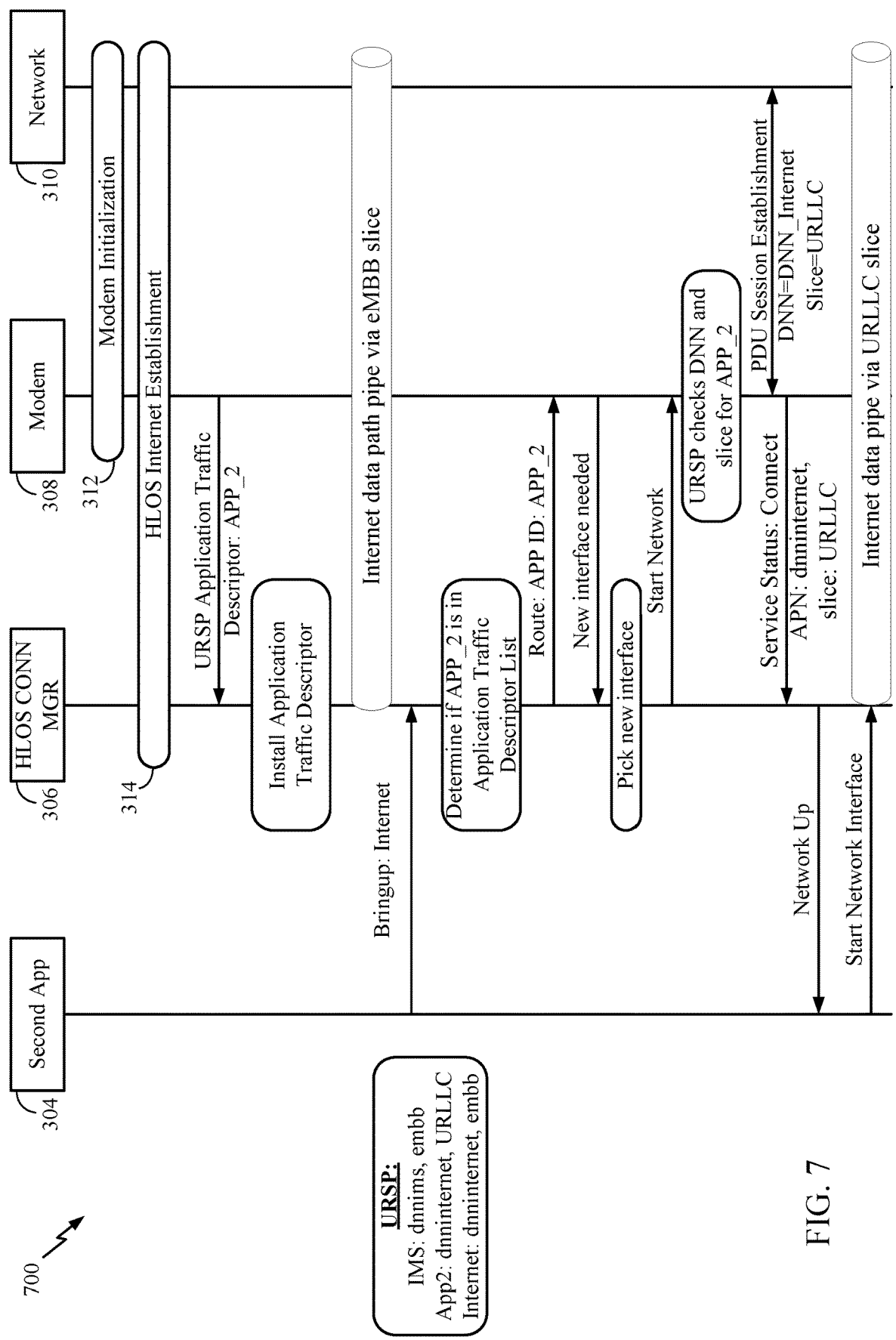
FIG. 7 is a call-flow diagram illustrating a second example method for establishing multi-slice communication between a UE and a network, in accordance with certain aspects of the present disclosure.

FIG. 7 is a call flow diagram 700 illustrating a second example method for establishing multi-slice communication between a UE 120a and a network 310. In accordance with various aspects of the disclosure, an element of FIG. 7, or any portion of an element, or any combination of elements may be implemented with the controller/processor 280 and/or modem 254 of FIG. 2 that includes one or more processors.

At the outset, the modem initialization 312 and the HLOS internet establishment 314 may be the same as shown in FIG. 3 as described above, wherein an internet data path pipe via eMBB (not shown) is established. However, in this example, the modem 308 may be configured to provide the HLOS connection manager 306 with an indication of any non-default traffic descriptors (e.g., app ID (e.g., APP2), IP address of a particular server, etc.). In response the HLOS connection manager 306 may install an application traffic descriptor corresponding to the non-default traffic descriptors.

The second app 304 may then request, from the HLOS connection manager 306, to bring up a connection, such as an Internet connection, the request indicating a service and/or DNN for the connection. In response the HLOS connection manager 306 determines a traffic descriptor associated with the second app 304, and may determine whether the traffic descriptor is a non-default traffic descriptor, as indicated by the modem 308. If the traffic descriptor is not a non-default traffic descriptor, then the HLOS connection manager 306 may configure the second app 304 for communication over a default connection, such as the internet data path pipe via the eMBB slice.

However, if the HLOS connection manager 306 determines that the traffic descriptor of the second app 304 is a non-default traffic descriptor, the HLOS connection manager 306 may notify the modem 308 of the request. In response, the modem 308 may notify the HLOS connection manger 306 to utilize one of: (i) the existing internet data path pipe via the eMBB slice, or (ii) a new interface is required. For example, if the traffic descriptor of the second app 304 maps to a URSP rule that indicates a URLLC slice, then a new interface will be required.

In response to a notification that a new interface is required, the HLOS connection manager 306 may pick a new interface (e.g., determine a data network and slice of the new interface) and request the modem 308 to start the new interface. Alternatively, if a new interface is required, the modem may inform the HLOS connection manage 306 of a DNN and a slice combination of the new interface. In some examples, the request to start the new interface may include the traffic descriptor, which, in an example is an app ID corresponding to the second app.

In response to the HLOS connection manager 306, the modem 308 may check the URSP for the data network and the slice corresponding to the traffic descriptor, and establish a PDU session with the network 310 according to the information of the traffic descriptor. Once the PDU session is established, the modem 308 may notify the HLOS connection manager 306 that the service is connected. The HLOS connection manager 306 may notify the second application of the same, and the second app 304 may then proceed to communicate using an internet data pipe via the URLLC slice.

Figure 8:
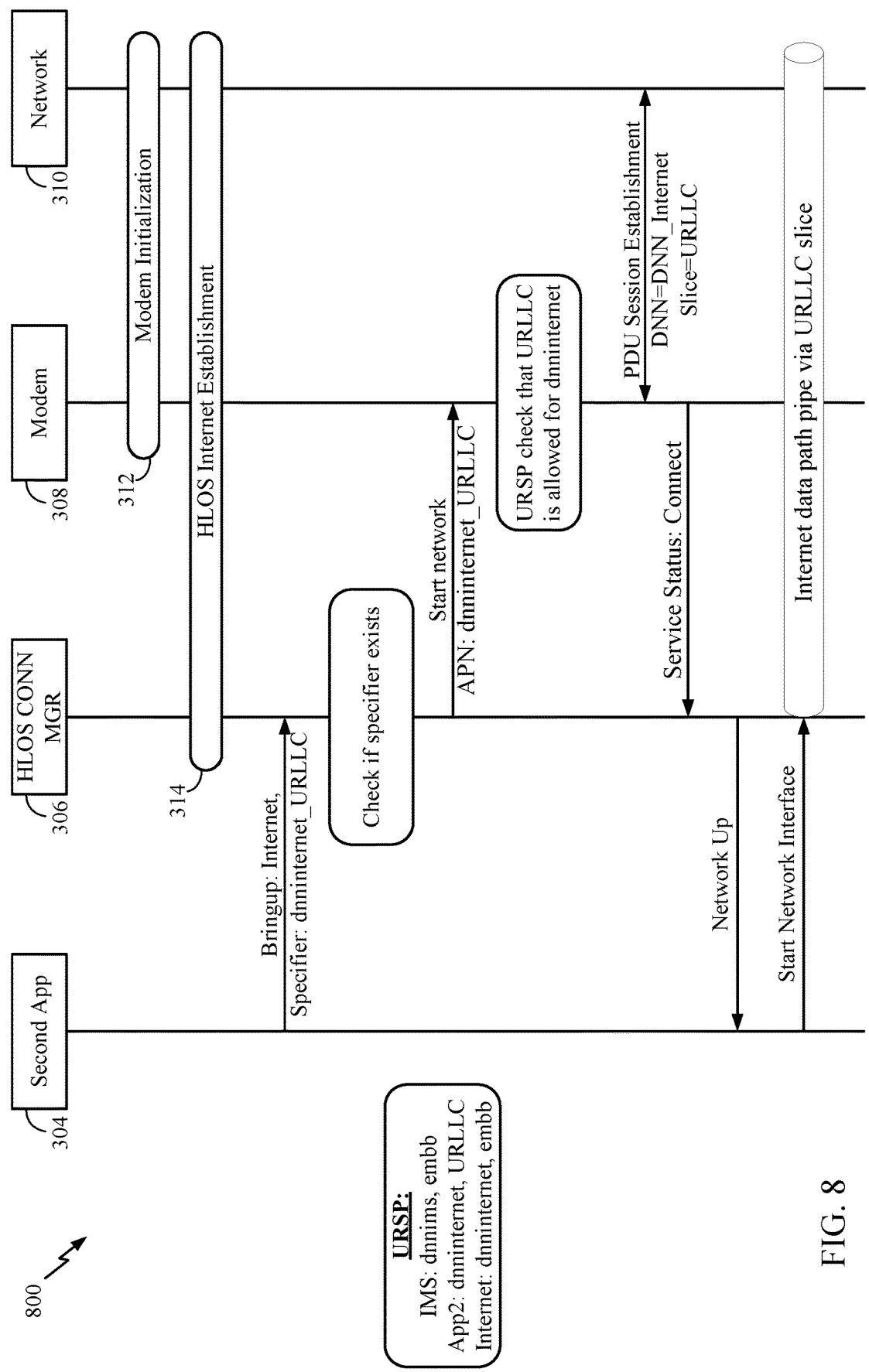
FIG. 8 is a call-flow diagram illustrating a third example method for establishing multi-slice communication between a UE and a network, in accordance with certain aspects of the present disclosure.

FIG. 8 is a call flow diagram 800 illustrating a third example method for establishing multi-slice communication between a UE 120a and a network 310. In accordance with various aspects of the disclosure, an element of FIG. 8, or any portion of an element, or any combination of elements may be implemented with the controller/processor 280 and/or modem 254 of FIG. 2 that includes one or more processors.

At the outset, the modem initialization 312 and the HLOS internet establishment 314 may be the same as shown in FIG. 3 as described above, wherein an internet data path pipe via eMBB (not shown) is established. However, in this example, the second app 304 may communicate a request to the HLOS connection manager 306 requesting an internet connection via a URLLC slice. The request includes a specifier identifying the service requested (e.g., internet) and the corresponding slice (e.g., URLLC). The specifier can be any value or string that the modem can map to a DNN and/or APN of a data network and a slice. Accordingly, the second app 304 itself can specifically request a particular DNN with a particular slice. In certain embodiments, the request also includes a DNN.

The HLOS connection manager 306 may then determine if the specifier exists in a database managed by the HLOS connection manager 306. For example, the HLOS connection manager 306 may look up the specifier in the database and determine a corresponding DNN/APN associated with the specifier. The HLOS connection manager 306 may then communicate the DNN/APN to the modem 308, along with the specifier and/or an indication of the slice, in a request to start a network connection according to the request by the second application 304.

The modem 308 may then check the URSP to determine whether the requested slice (e.g., URLLC) is allowed or available from the network 310 for the service/DNN indicated. If the URSP does not indicate that the requested slice can be used for the corresponding service, the modem 308 may deny a PDU session establishment. However, if the URSP indicates that the requested slice can be used for the corresponding service, the modem 308 may establish a PDU session for the second app 304, and notify the HLOS connection manager 306 when the PDU session is established. The HLOS connection manager 306 may then notify the second app 304 of the connection establishment (e.g., establishment of the internet data path pipe via the URLLC slice), and the second app 304 may communicate over the internet data path pipe via the URLLC slice.

Figure 9:
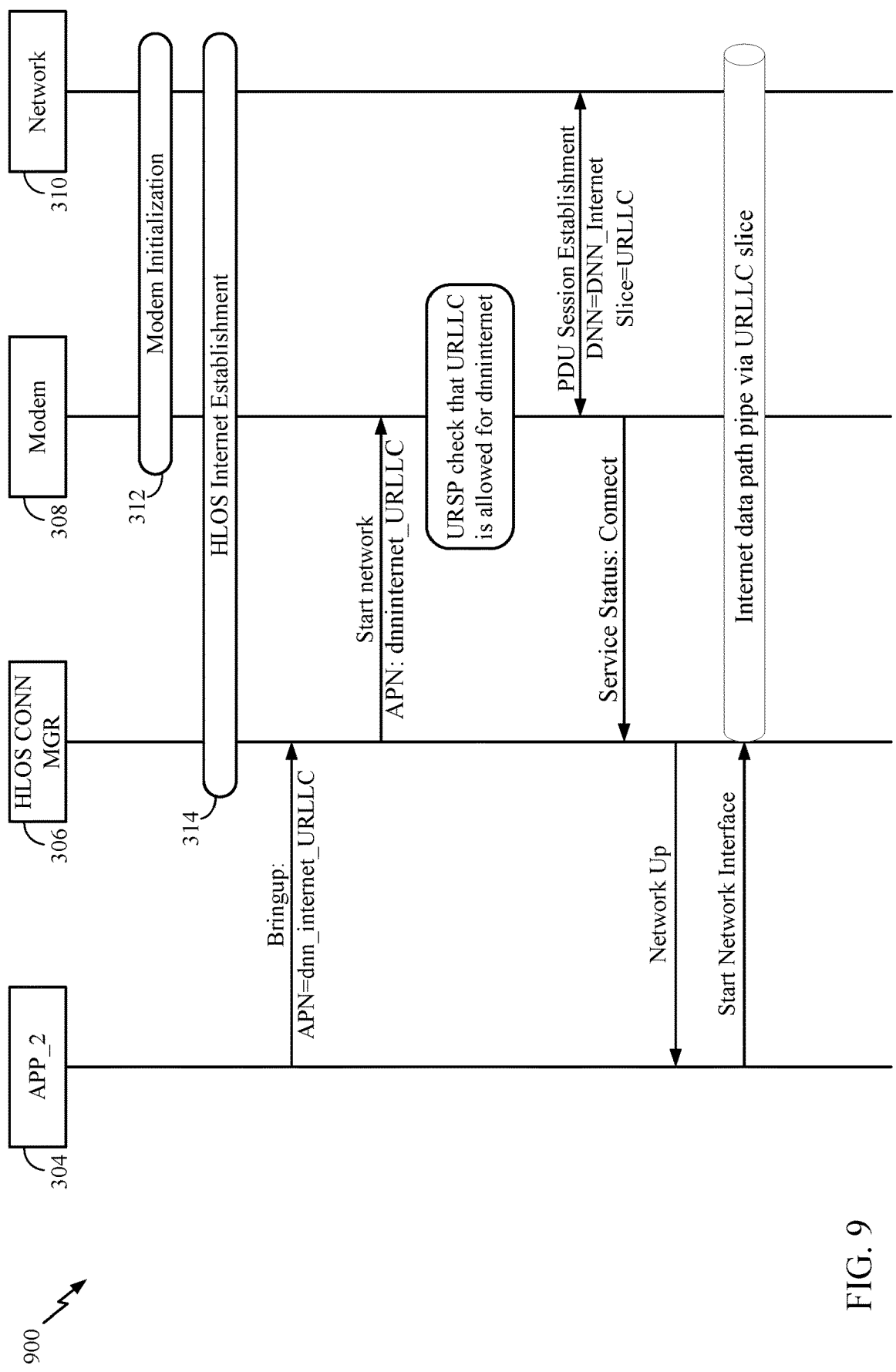
FIG. 9 is a call-flow diagram illustrating a fourth example method for establishing multi-slice communication between a UE and a network, in accordance with certain aspects of the present disclosure.

FIG. 9 is a call flow diagram 900 illustrating a fourth example method for establishing multi-slice communication between a UE 120a and a network 310. In accordance with various aspects of the disclosure, an element of FIG. 9, or any portion of an element, or any combination of elements may be implemented with the controller/processor 280 and/or modem 254 of FIG. 2 that includes one or more processors.

FIG. 9 is a variation of the method shown in FIG. 8, wherein the HLOS connection manager 306 immediately proceeds to request the modem 308 to start a network based on a request form the second app 304. In this example, the HLOS connection manager 306 does not first look up the specifier in the database to determine whether there is a corresponding APN associated with the specifier. Instead, the HLOS connection manager 306 passes the information provided by the second app 304 to the modem 308.

Figure 10:
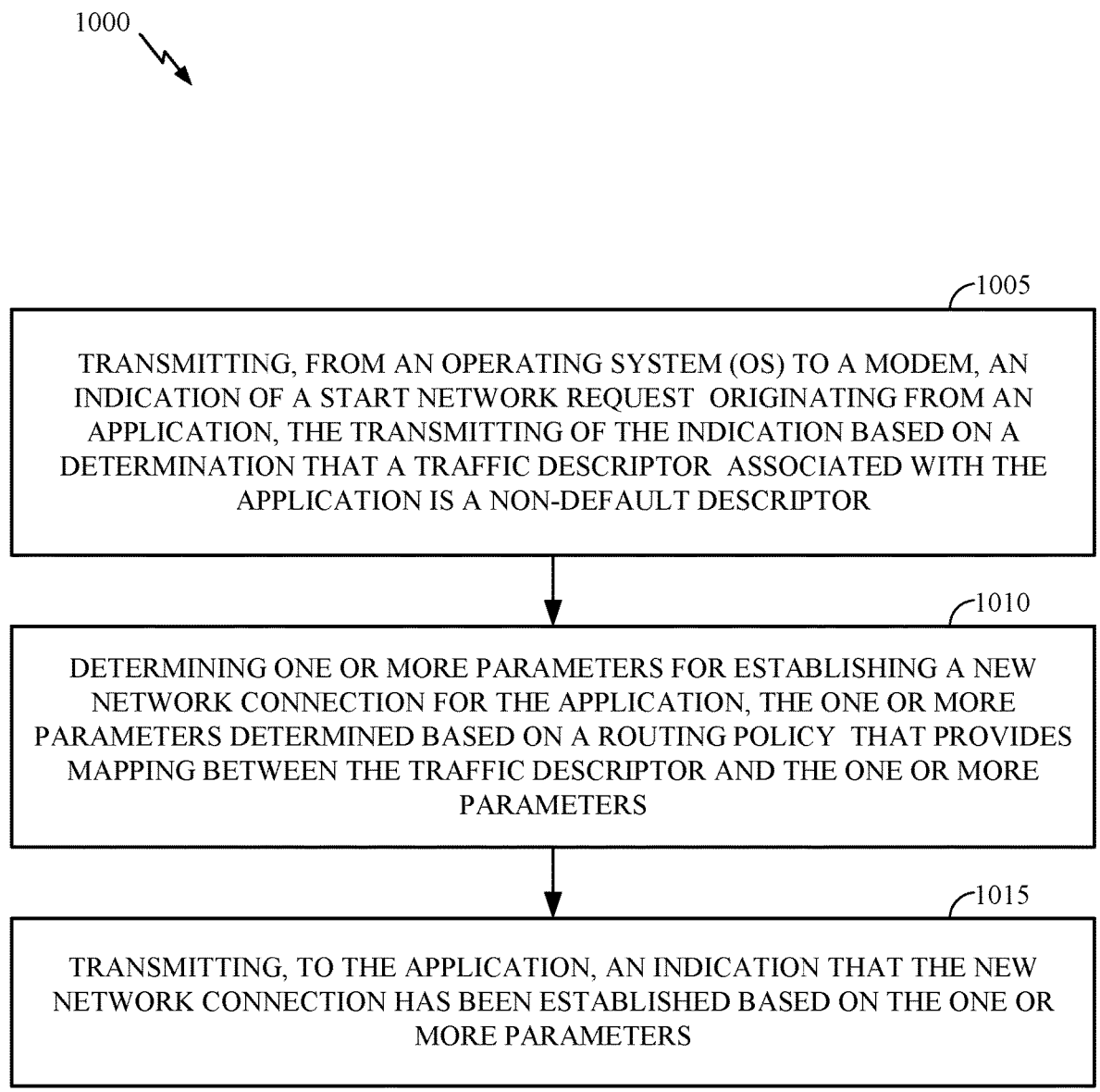
FIG. 10 is a flow diagram illustrating example operations for wireless communication, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as the UE 120a in the wireless communication network 100 of FIG. 1). Operations 1000 may be implemented as software components that are executed and run on one or more processors (e.g., controller/processor 280 of FIG. 2) and/or a modem (e.g., modem 254 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, by transmitting, from an operating system (OS) to a modem, an indication of a start network request originating from an application, the transmitting of the indication based on a determination that a traffic descriptor associated with the application is a non-default descriptor.

The operations 1000 may proceed at block 1010, by determining one or more parameters for establishing a new network connection for the application, the one or more parameters determined based on a routing policy that provides mapping between the traffic descriptor and the one or more parameters.

The operations 1000 may proceed at block 1015, by transmitting, to the application, an indication that the new network connection has been established based on the one or more parameters.

In certain aspects, the operations 1000 include receiving, from the modem, an application descriptor list comprising one or more traffic descriptors that are non-default descriptors, the one or more traffic descriptors comprising an application identifier associated with the application, wherein any traffic descriptor not on the application descriptor list is a default descriptor.

In certain aspects, the default descriptor is associated with a first DNN and a first network slice, wherein the non-default descriptor is associated with the first DNN and a second network slice, and wherein the default descriptor is a default descriptor for the first DNN.

In certain aspects, the non-default descriptor indicates that the application communicates via the second network slice.

In certain aspects, the operations 1000 include determining, by the OS, that the traffic descriptor associated with the application is the non-default descriptor, wherein the determination indicates that the application has permission from the modem to communicate via the second network slice.

In certain aspects, the one or more parameters comprise one or more of a data network name (DNN) or a network slice, wherein each of the DNN and the network slice are associated with the traffic descriptor.

In certain aspects, the operations 1000 include transmitting, to the modem, a command to establish the new network connection, the command comprising the one or more parameters.

In certain aspects, the operations 1000 include receiving, from the modem, the indication that the new network connection has been established, and wherein transmitting the indication to the application is in response to receiving the indication from the modem.

In certain aspects, the operations 1000 include storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, the operations 1000 include executing, by one or more processors, an operating system and one or more applications including an application, wherein: the application is configured to send a request for a route identifier to the operating system; the operating system, based on receiving the request for the route identifier, is configured to send the request for the route identifier to the modem with an application identifier associated with the application; the modem, based on receiving the request for the route identifier with the application identifier, is configured to generate the route identifier and associate the route identifier with the second traffic descriptor; the modem is configured to send the route identifier to the operating system; the operating system, based on receiving the route identifier, is configured to send the route identifier to the application; the application is configured to send a request to bring up an interface to the operating system, the request to bring up the interface including the route identifier; the operating system, based on receiving the request to bring up the interface, is configured to determine if the interface is already up based on the route identifier; when the operating system determines the interface is already up, the operating system is configured to send an identifier of the interface to the application; when the operating system determines the interface is not already up: the operating system is configured to send a start network command to the modem, the start network command including the route identifier; the modem, based on receiving the start network command, is configured to determine the first DNN and the second slice as associated with the route identifier based on the route selection policy and establish a protocol data unit (PDU) session associated with the first DNN and the second slice; the modem is configured to send to the operating system an indication of the PDU session establishment; the operating system, based on receiving the indication of the PDU session establishment, is configured to set an interface status as up and associated with the route identifier; and the operating system is configured to send the identifier of the interface to the application; and the application is configured to utilize the interface for communication.

In certain aspects, the request to bring up the interface further includes an identifier of the first DNN, wherein the start network command further includes the identifier of the first DNN.

In certain aspects, the modem generates the route identifier as a random string.

In certain aspects, the application does not have a mapping of the route identifier to the second slice.

In certain aspects, the second traffic descriptor is one of an application identifier of the application or a remote Internet protocol (IP) address associated with the application.

In certain aspects, the first slice is enhanced Mobile Broadband (eMBB), and wherein the second slice is one of Ultra-Reliable Low Latency Communications (URLLC) or massive Internet of Things (MIoT).

In certain aspects, wherein the first DNN is the Internet.

Figure 11:
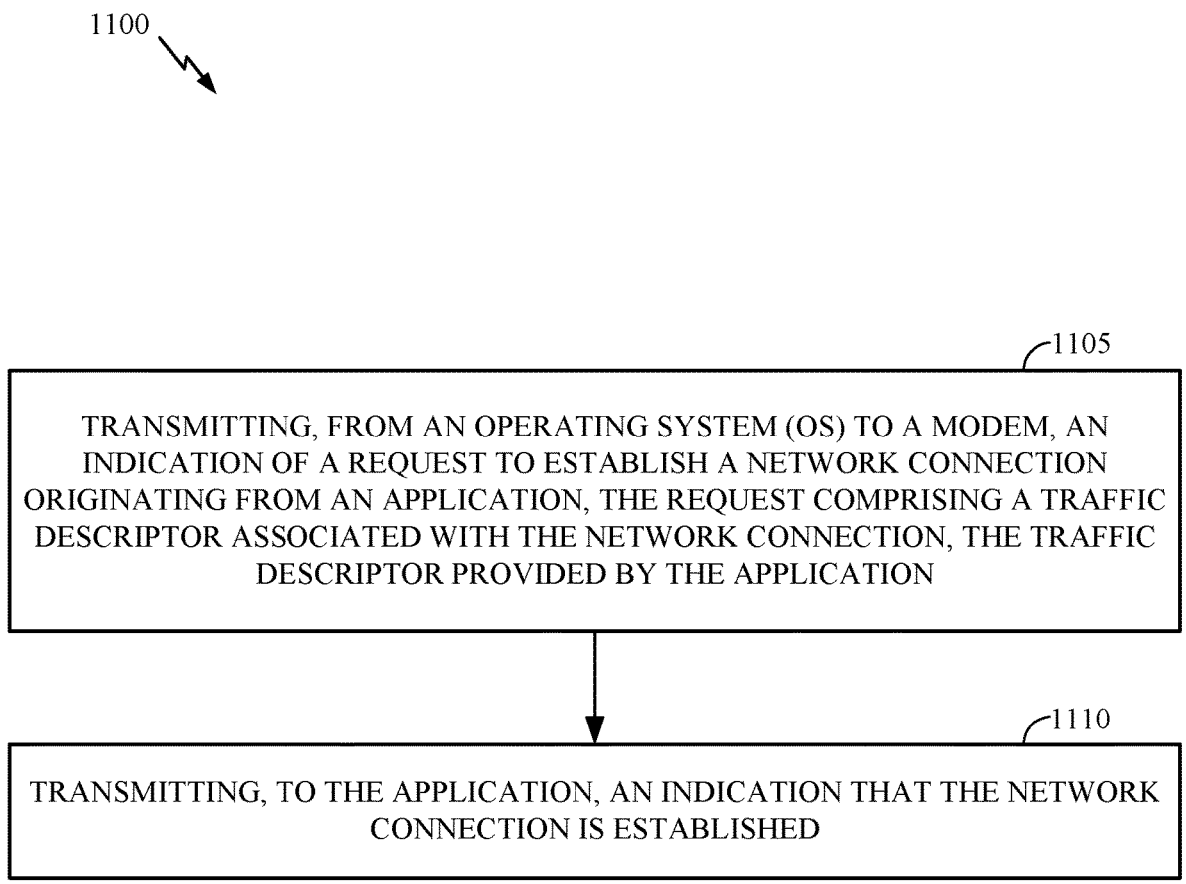
FIG. 11 is a flow diagram illustrating example operations for wireless communication, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 120a in the wireless communication network 100 of FIG. 1). Operations 1100 may be implemented as software components that are executed and run on one or more processors (e.g., controller/processor 280 of FIG. 2) and/or a modem (e.g., modem 254 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at block 1105, by transmitting, from an operating system (OS) to a modem, an indication of a request to establish a network connection originating from an application, the request comprising a traffic descriptor associated with the network connection, the traffic descriptor provided by the application.

The operations 1100 may proceed, at block 1110, by transmitting, to the application, an indication that the network connection is established.

In certain aspects, the traffic descriptor is indicative of one or more of a service requested for the network connection and a network slice associated with the network connection.

In certain aspects, the operations 1100 include determining whether the traffic descriptor exists in a database maintained by the OS, wherein if the traffic descriptor exists in the database, the method further comprises transmitting, to the modem, one or more of a data network name (DNN) or an access point name (APN) associated with the traffic descriptor in the database, and wherein if the traffic descriptor does not exist in the database, the method further comprises transmitting, to the modem, the traffic descriptor.

In certain aspects, the traffic descriptor comprises one or more of a data network name (DNN) or an access point name (APN) associated with the network connection.

In certain aspects, the operations 1100 include receiving, from the modem, the indication that the network connection is established prior to transmitting the indication to the application, wherein the receiving the indication implicitly indicates that the modem approved the network connection.

In certain aspects, the operations 1100 include approving, by the modem, the network connection based on a routing policy that provides mapping between the traffic descriptor provided by the application and a data network name (DNN) or an access point name (APN) associated with the traffic descriptor.

In certain aspects, the operations 1100 include storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default traffic descriptor for the first DNN.

In certain aspects, the operations 1100 include executing, by one or more processors, an operating system and one or more applications including an application, wherein: the modem is configured to indicate any non-default traffic descriptors, including the second traffic descriptor, to the operating system; the application is configured to send a request to bring up an interface to the operating system, the operating system is configured to, based on receiving the request to bring up the interface, determine if a traffic descriptor associated with the application is a non-default traffic descriptor indicated by the modem; when the traffic descriptor is not a non-default traffic descriptor, the operating system is configured to indicate a first interface associated with default traffic descriptor to the application based on the request to bring up the interface, and the application is configured to utilize the first interface for communication; and when the traffic descriptor is a non-default traffic descriptor and is the second traffic descriptor: the operating system is configured to send a route lookup to the modem, the route lookup including the second traffic descriptor; the modem is configured to, based on receiving the route lookup, indicate a new interface is needed to the operating system based on the second traffic descriptor being a non-default traffic descriptor; the operating system is configured to pick a second interface to perform the request to bring up the interface; the operating system is configured to send a start network command to the modem, the start network command including the second traffic descriptor; the modem, based on receiving the start network command, is configured to determine the first DNN and the second slice as associated with the second traffic descriptor based on the route selection policy and establish a protocol data unit (PDU) session associated with the first DNN and the second slice; the modem is configured to send to the operating system an indication of the PDU session establishment including an identifier of the first DNN and an identifier of the second slice; the operating system, based on receiving the indication of the PDU session establishment, is configured to set the second interface status as up and associated with the first DNN and the second slice; and the operating system is configured to send an identifier of the second interface to the application; and the application is configured to utilize the second interface for communication.

In certain aspects, the second traffic descriptor is one of an application identifier of the application or a remote Internet protocol (IP) address associated with the application.

In certain aspects, the first slice is enhanced mobile broadband (eMBB), and wherein the second slice is one of ultra-reliable low latency communications (URLLC) or massive internet of things (MIoT).

Figure 12:
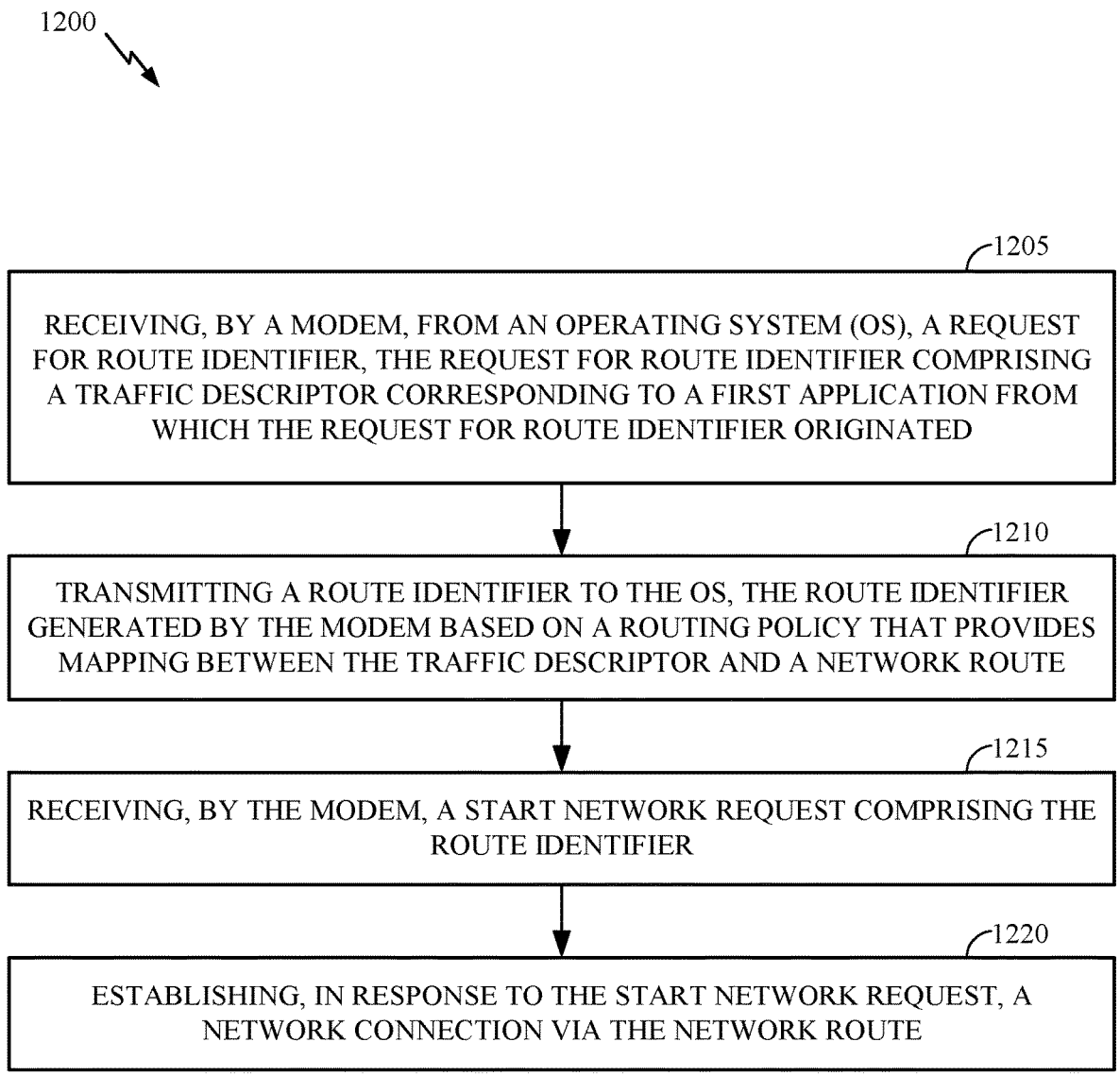
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as the UE 120a in the wireless communication network 100 of FIG. 1). Operations 1200 may be implemented as software components that are executed and run on one or more processors (e.g., controller/processor 280 of FIG. 2) and/or a modem (e.g., modem 254 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at block 1205, by receiving, by the modem, from an operating system (OS), a request for route identifier, the request for route identifier comprising a traffic descriptor corresponding to a first application from which the request for route identifier originated.

The operations 1200 may proceed, at block 1210, by transmitting a route identifier to the OS, the route identifier generated by a modem based on a routing policy that provides mapping between the traffic descriptor and a network route.

The operations 1200 may proceed, at block 1215, by receiving, by the modem, a start network request comprising the route identifier.

The operations 1200 may proceed, at block 1220, by establishing, in response to the start network request, a network connection via the network route.

In certain aspects, the routing policy provides mapping between each of a plurality of traffic descriptors and a corresponding network route, and wherein each corresponding network route comprises a data network name (DNN) and an indication of a network slice.

In certain aspects, a first traffic descriptor of the plurality of traffic descriptors is associated with a first DNN and a first network slice, wherein a second traffic descriptor of the plurality of traffic descriptors is associated with the first DNN and a second network slice, and wherein the first traffic descriptor is a default descriptor for the first DNN.

In certain aspects, transmitting the route identifier to the OS indicates that the first application has permission from the modem to communicate via the second network slice.

In certain aspects, establishing the network connection further comprises: determining, by the modem, a first data network name and a first network slice associated with the route identifier; and establishing a protocol data unit (PDU) session associated with the first DNN via the first network slice.

In certain aspects, the operations 1200 include storing an index mapping the network route to the generated route identifier, wherein the route identifier is a random string of one or more values.

In certain aspects, the traffic descriptor is added to the request for route identifier by the OS.

In certain aspects, the start network request originates from the first application, the method further comprising: receiving, by the OS, the start network request from the first application; in response to receiving the start network request, determining whether an existing network connection corresponding to the route identifier is available; when the existing network connection is available, enabling, by the OS, the first application for communication over the existing network connection; and when the existing network connection is not available, transmitting the start network request to the modem.

In certain aspects, the operations 1200 include notifying the OS, by the modem, that the network connection has been established.

The operations 1200 may include storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

The operations 1200 may include executing, by one or more processors, an operating system and one or more applications including an application, wherein: the application is configured to send a request to bring up an interface to the operating system, the request to bring up the interface including a specifier indicating the first DNN and the second slice; the operating system is configured to determine if the request to bring up the interface includes any specifier; the operating system is configured to, based on the request to bring up the interface including the specifier, send a start network command to the modem, the start network command including the specifier; the modem is configured to, based on receiving the start network command including the specifier, check if the route selection policy includes a traffic descriptor associated with both the first DNN and the second slice; the modem is configured to, based on the route selection policy including the second traffic descriptor associated with both the first DNN and the second slice, establish a protocol data unit (PDU) session associated with the first DNN and the second slice; the modem is configured to send to the operating system an indication of the PDU session establishment; the operating system, based on receiving the indication of the PDU session establishment, is configured to set the interface status as up and associated with the specifier; the operating system is configured to send the identifier of the interface to the application; and the application is configured to utilize the interface for communication.

Figure 13:
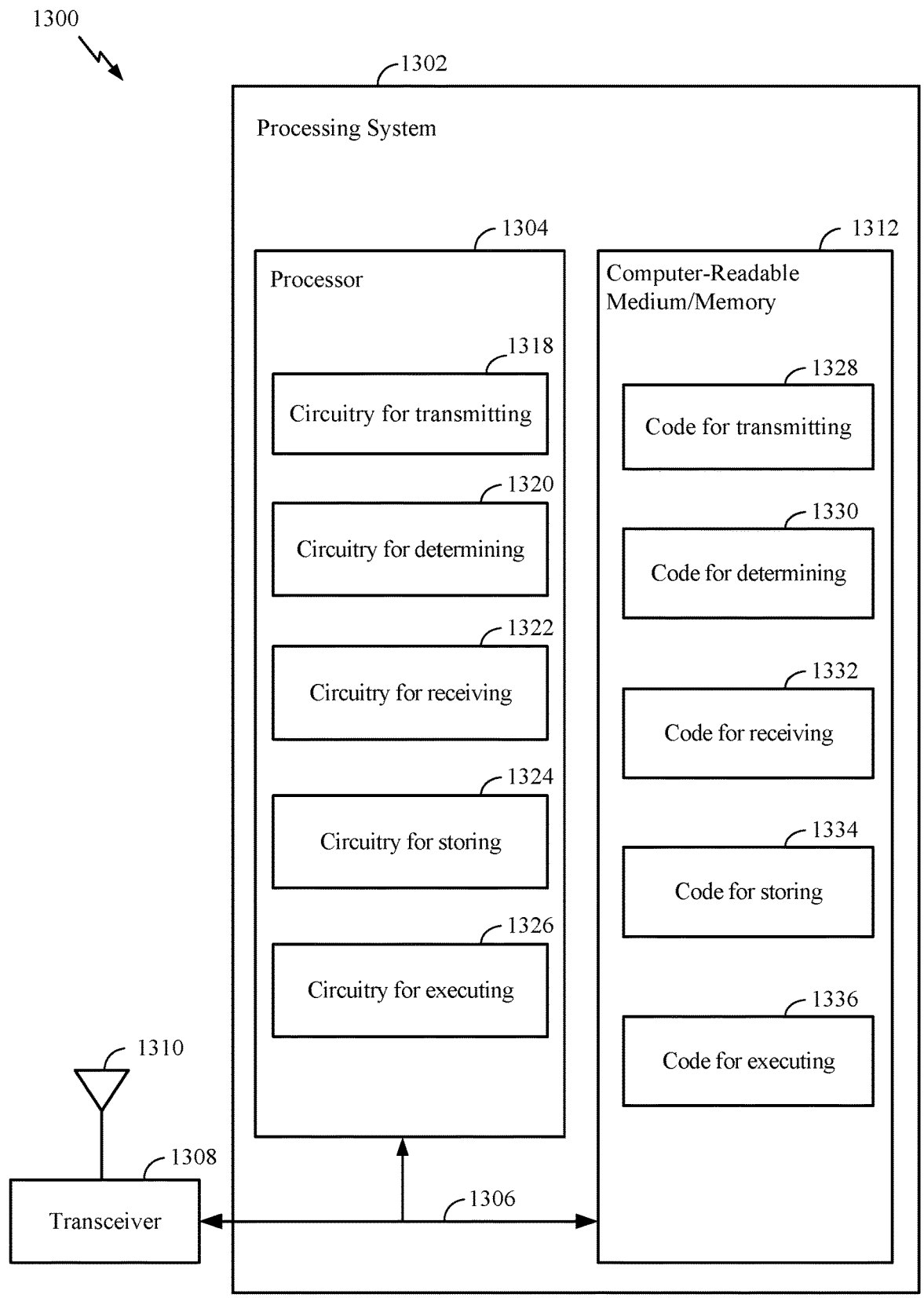
FIG. 13 illustrates a communications device that may include various components (e.g., corresponding to means-plus-function components) configured to perform operations for the techniques disclosed herein, such as the operations illustrated in FIG. 10.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein for supporting communication over multiple slices.

In certain aspects, computer-readable medium/memory 1312 stores code 1328 for transmitting, from an OS to a modem, an indication of a start network request originating from an application, the transmitting of the indication based on a determination that a traffic descriptor associated with the application is a non-default descriptor. In certain aspects, the code 1328 also provides for transmitting, to the application, an indication that the new network connection has been established based on the one or more parameters. In certain aspects, the code 1328 also provides for transmitting, to the modem, a command to establish the new network connection, the command comprising the one or more parameters.

In certain aspects, computer-readable medium/memory 1312 stores code 1330 for determining one or more parameters for establishing a new network connection for the application, the one or more parameters determined based on a routing policy that provides mapping between the traffic descriptor and the one or more parameters. In certain aspects, code 1330 also provides for determining, by the OS, that the traffic descriptor associated with the application is the non-default descriptor, wherein the determination indicates that the application has permission from the modem to communicate via the second network slice.

In certain aspects, computer-readable medium/memory 1312 stores code 1332 for receiving, from the modem, an application descriptor list comprising one or more traffic descriptors that are non-default descriptors, the one or more traffic descriptors comprising an application identifier associated with the application, wherein any traffic descriptor not on the application descriptor list is a default descriptor. In certain aspects, code 1332 also provides for receiving, from the modem, the indication that the new network connection has been established, wherein transmitting the indication to the application is in response to receiving the indication from the modem.

In certain aspects, computer-readable medium/memory 1312 stores code 1334 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, computer-readable medium/memory 1312 stores code 1336 for executing an operating system and one or more applications.

In certain aspects, the processor 1304 has circuitry configured to implement the code stored in the computer-readable medium/memory 1312. The processor 1304 includes circuitry 1318 for storing a route selection policy; and circuitry 1320 for executing an application.

In certain aspects, the processor 1304 has circuitry configured to implement the code stored in the computer-readable medium/memory 1312. The processor 1304 includes circuitry 1318 for transmitting, from an OS to a modem, an indication of a start network request originating from an application, the transmitting of the indication based on a determination that a traffic descriptor associated with the application is a non-default descriptor. In certain aspects, the circuitry 1318 also provides for transmitting, to the application, an indication that the new network connection has been established based on the one or more parameters. In certain aspects, the circuitry 1318 also provides for transmitting, to the modem, a command to establish the new network connection, the command comprising the one or more parameters.

In certain aspects, the processor 1304 has circuitry configured to implement the code stored in the computer-readable medium/memory 1312. The processor 1304 includes circuitry 1320 for establishing a new network connection for the application, the one or more parameters determined based on a routing policy that provides mapping between the traffic descriptor and the one or more parameters. In certain aspects, circuitry 1320 also provides for determining, by the OS, that the traffic descriptor associated with the application is the non-default descriptor, wherein the determination indicates that the application has permission from the modem to communicate via the second network slice.

In certain aspects, the processor 1304 has circuitry configured to implement the code stored in the computer-readable medium/memory 1312. The processor 1304 includes circuitry 1322 for receiving, from the modem, an application descriptor list comprising one or more traffic descriptors that are non-default descriptors, the one or more traffic descriptors comprising an application identifier associated with the application, wherein any traffic descriptor not on the application descriptor list is a default descriptor. In certain aspects, circuitry 1322 also provides for receiving, from the modem, the indication that the new network connection has been established, wherein transmitting the indication to the application is in response to receiving the indication from the modem.

In certain aspects, the processor 1304 has circuitry configured to implement the code stored in the computer-readable medium/memory 1312. The processor 1304 includes circuitry 1324 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, the processor 1304 has circuitry configured to implement the code stored in the computer-readable medium/memory 1312. The processor 1304 includes circuitry 1326 for executing an operating system and one or more applications.

Figure 14:
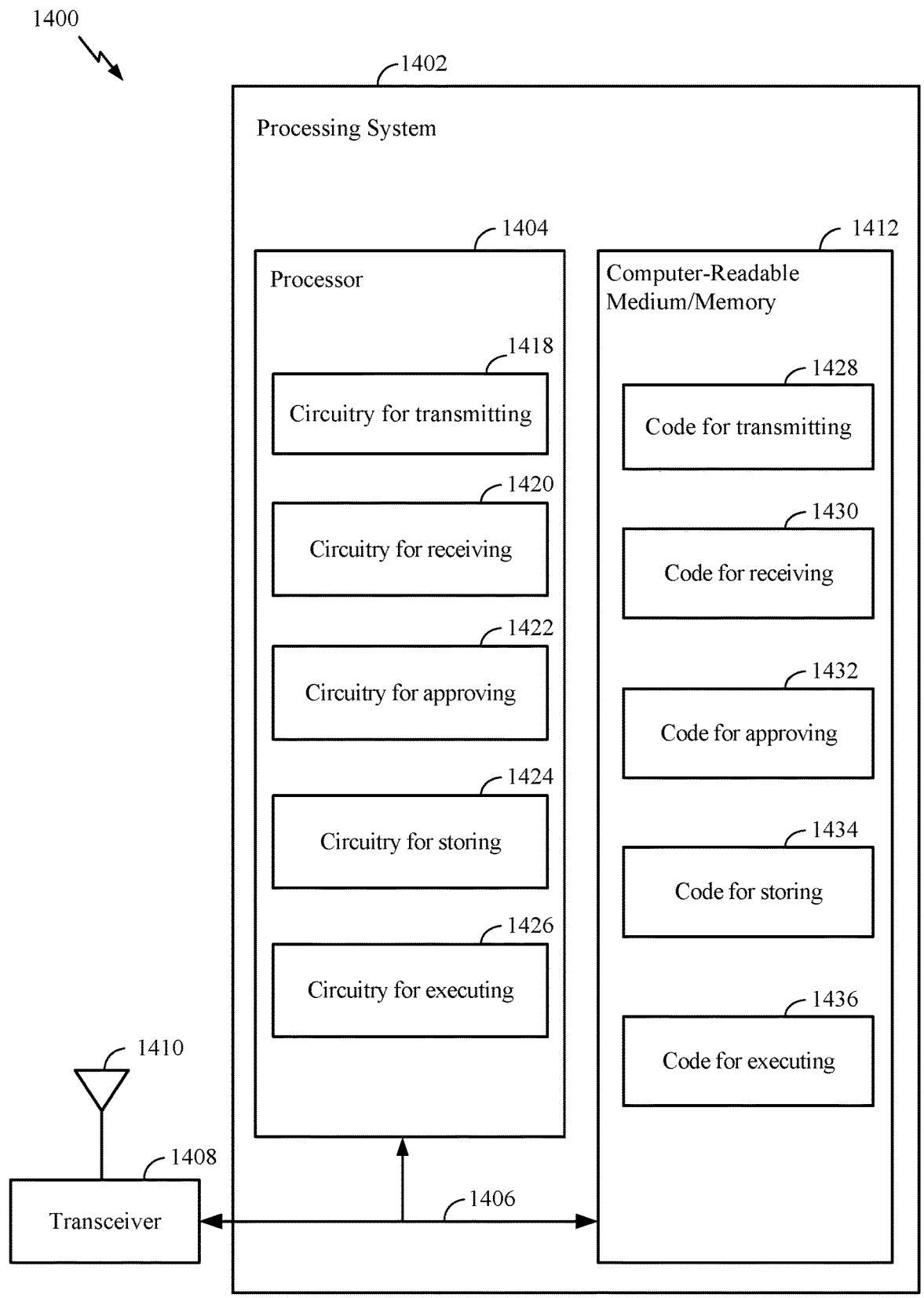
FIG. 14 illustrates a communications device that may include various components (e.g., corresponding to means-plus-function components) configured to perform operations for the techniques disclosed herein, such as the operations illustrated in FIG. 11.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for supporting communication over multiple slices.

In certain aspects, computer-readable medium/memory 1412 stores code 1428 for transmitting, from an operating system (OS) to a modem, an indication of a request to establish a network connection originating from an application, the request comprising a traffic descriptor associated with the network connection, the traffic descriptor provided by the application. In certain aspects, the code 1428 also provides for transmitting, to the application, an indication that the network connection is established.

In certain aspects, computer-readable medium/memory 1412 stores code 1430 for receiving, from the modem, the indication that the network connection is established prior to transmitting the indication to the application, wherein the receiving the indication implicitly indicates that the modem approved the network connection.

In certain aspects, computer-readable medium/memory 1412 stores code 1432 for approving, by the modem, the network connection based on a routing policy that provides mapping between the traffic descriptor provided by the application and a data network name (DNN) or an access point name (APN) associated with the traffic descriptor.

In certain aspects, computer-readable medium/memory 1412 stores code 1434 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, computer-readable medium/memory 1412 stores code 1436 for executing an operating system and one or more applications.

In certain aspects, the processor 1404 has circuitry configured to implement the code stored in the computer-readable medium/memory 1412. The processor 1404 includes circuitry 1418 for transmitting, from an operating system (OS) to a modem, an indication of a request to establish a network connection originating from an application, the request comprising a traffic descriptor associated with the network connection, the traffic descriptor provided by the application. In certain aspects, the code 1428 also provides for transmitting, to the application, an indication that the network connection is established.

In certain aspects, the processor 1404 includes circuitry 1420 for receiving, from the modem, the indication that the new network connection has been established, wherein transmitting the indication to the application is in response to receiving the indication from the modem.

In certain aspects, the processor 1404 includes circuitry 1422 for approving, by the modem, the network connection based on a routing policy that provides mapping between the traffic descriptor provided by the application and a data network name (DNN) or an access point name (APN) associated with the traffic descriptor.

In certain aspects, the processor 1404 includes circuitry 1424 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, the processor 1404 includes circuitry 1426 for executing an operating system and one or more applications.

Figure 15:
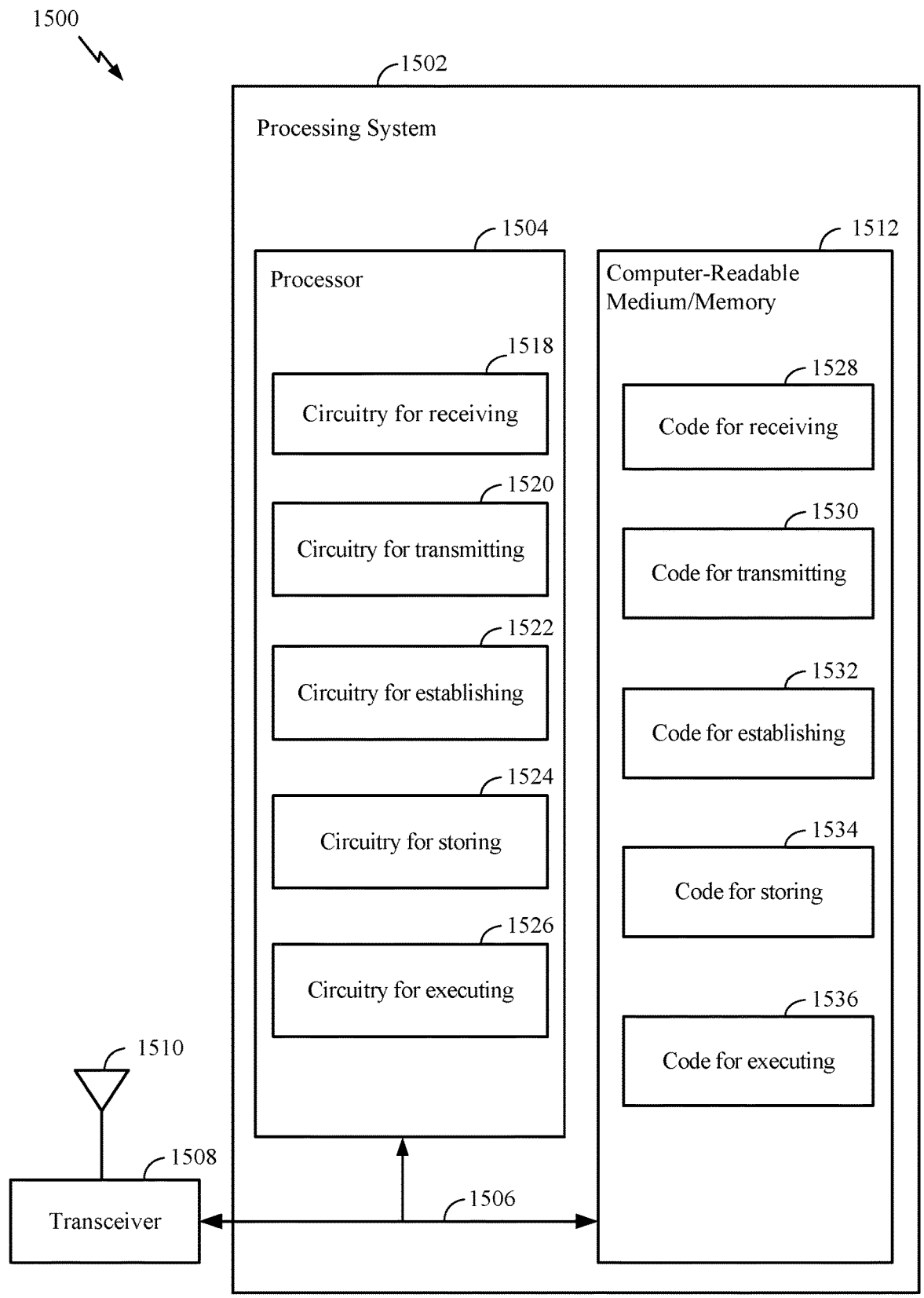
FIG. 15 illustrates a communications device that may include various components (e.g., corresponding to means-plus-function components) configured to perform operations for the techniques disclosed herein, such as the operations illustrated in FIG. 12.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for supporting communication over multiple slices.

In certain aspects, computer-readable medium/memory 1512 stores code 1528 for receiving, by the modem, from an operating system (OS), a request for route identifier, the request for route identifier comprising a traffic descriptor corresponding to a first application from which the request for route identifier originated. In certain aspects, the code 1528 also provides for receiving, by the modem, a start network request comprising the route identifier. In certain aspects, the code 1528 also provides for receiving, by the OS, the start network request from the first application.

In certain aspects, computer-readable medium/memory 1512 stores code 1530 for transmitting a route identifier to the OS, the route identifier generated by a modem based on a routing policy that provides mapping between the traffic descriptor and a network route.

In certain aspects, computer-readable medium/memory 1512 stores code 1532 for establishing, in response to the start network request, a network connection via the network route. Code 1532 also provides for establishing a protocol data unit (PDU) session associated with the first DNN via the first network slice.

In certain aspects, computer-readable medium/memory 1512 stores code 1534 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, computer-readable medium/memory 1512 stores code 1536 for executing an operating system and one or more applications.

In certain aspects, the processor 1504 has circuitry configured to implement the code stored in the computer-readable medium/memory 1512. The processor 1504 includes circuitry 1518 for receiving, by the modem, from an operating system (OS), a request for route identifier, the request for route identifier comprising a traffic descriptor corresponding to a first application from which the request for route identifier originated. In certain aspects, the circuitry 1518 also provides for receiving, by the modem, a start network request comprising the route identifier. In certain aspects, the circuitry 1518 also provides for receiving, by the OS, the start network request from the first application.

In certain aspects, the processor 1504 includes circuitry 1520 for transmitting a route identifier to the OS, the route identifier generated by a modem based on a routing policy that provides mapping between the traffic descriptor and a network route.

In certain aspects, the processor 1504 includes circuitry 1522 for approving, by the modem, the network connection based on a routing policy that provides mapping between the traffic descriptor provided by the application and a data network name (DNN) or an access point name (APN) associated with the traffic descriptor.

In certain aspects, the processor 1504 includes circuitry 1524 for storing, by a modem, a route selection policy, the route selection policy associating each of a plurality of traffic descriptors with a corresponding data network name (DNN) and a corresponding slice, wherein a first traffic descriptor of the plurality of traffic descriptors is associated with a first DNN and a first slice, wherein a second traffic descriptor of the plurality of traffic descriptors is associated with the first DNN and a second slice different than the first slice, wherein the first traffic descriptor is a default descriptor for the first DNN.

In certain aspects, the processor 1504 includes circuitry 1526 for executing an operating system and one or more applications.

Example Aspects

Implementation examples are described in the following numbered clauses:

1. A method for wireless communication at a user equipment (UE), comprising: transmitting, from an operating system (OS) to a modem, an indication of a start network request originating from an application, the transmitting of the indication based on a determination that a traffic descriptor associated with the application is a non-default descriptor; determining one or more parameters for establishing a new network connection for the application, the one or more parameters determined based on a routing policy that provides mapping between the traffic descriptor and the one or more parameters; and transmitting, to the application, an indication that the new network connection has been established based on the one or more parameters.

2. The method of aspect 1, further comprising receiving, from the modem, an application descriptor list comprising one or more traffic descriptors that are non-default descriptors, the one or more traffic descriptors comprising an application identifier associated with the application, wherein any traffic descriptor not on the application descriptor list is a default descriptor.

3. The method of any of aspects 1 and 2, wherein the default descriptor is associated with a first DNN and a first network slice, wherein the non-default descriptor is associated with the first DNN and a second network slice, and wherein the default descriptor is a default descriptor for the first DNN.

4. The method of any of aspects 1-3, wherein the non-default descriptor indicates that the application communicates via the second network slice.

5. The method of any of aspects 1-4, further comprising determining, by the OS, that the traffic descriptor associated with the application is the non-default descriptor, wherein the determination indicates that the application has permission from the modem to communicate via the second network slice.

6. The method of any of aspects 1-5, wherein the one or more parameters comprise one or more of a data network name (DNN) or a network slice, wherein each of the DNN and the network slice are associated with the traffic descriptor.

7. The method of any of aspects 1-6, further comprising transmitting, to the modem, a command to establish the new network connection, the command comprising the one or more parameters.

8. The method of any of aspects 1-7, further comprising receiving, from the modem, the indication that the new network connection has been established, wherein transmitting the indication to the application is in response to receiving the indication from the modem.

9. A method for wireless communication at a user equipment (UE), comprising: transmitting, from an operating system (OS) to a modem, an indication of a request to establish a network connection originating from an application, the request comprising a traffic descriptor associated with the network connection, the traffic descriptor provided by the application; and transmitting, to the application, an indication that the network connection is established.

10. The method of aspect 9, wherein the traffic descriptor is indicative of one or more of a service requested for the network connection and a network slice associated with the network connection.

11. The method of any of aspect 9 and 10, further comprising determining whether the traffic descriptor exists in a database maintained by the OS, wherein if the traffic descriptor exists in the database, the method further comprises transmitting, to the modem, one or more of a data network name (DNN) or an access point name (APN) associated with the traffic descriptor in the database, and wherein if the traffic descriptor does not exist in the database, the method further comprises transmitting, to the modem, the traffic descriptor.

12. The method of any of aspects 9-11, wherein the traffic descriptor comprises one or more of a data network name (DNN) or an access point name (APN) associated with the network connection.

13. The method of any of aspects 9-12, further comprising receiving, from the modem, the indication that the network connection is established prior to transmitting the indication to the application, wherein the receiving the indication implicitly indicates that the modem approved the network connection.

14. The method of any of aspects 9-13, further comprising approving, by the modem, the network connection based on a routing policy that provides mapping between the traffic descriptor provided by the application and a data network name (DNN) or an access point name (APN) associated with the traffic descriptor.

15. A method for wireless communication at a user equipment (UE), comprising: receiving, by the modem, from an operating system (OS), a request for route identifier, the request for route identifier comprising a traffic descriptor corresponding to a first application from which the request for route identifier originated; transmitting a route identifier to the OS, the route identifier generated by a modem based on a routing policy that provides mapping between the traffic descriptor and a network route; receiving, by the modem, a start network request comprising the route identifier; and establishing, in response to the start network request, a network connection via the network route.

16. The method of aspect 15, wherein the routing policy provides mapping between each of a plurality of traffic descriptors and a corresponding network route, and wherein each corresponding network route comprises a data network name (DNN) and an indication of a network slice.

17. The method of any of aspects 15 and 16, wherein a first traffic descriptor of the plurality of traffic descriptors is associated with a first DNN and a first network slice, wherein a second traffic descriptor of the plurality of traffic descriptors is associated with the first DNN and a second network slice, and wherein the first traffic descriptor is a default descriptor for the first DNN.

18. The method of any of aspects 15-17, wherein the transmitting the route identifier to the OS indicates that the first application has permission from the modem to communicate via the second network slice.

19. The method of any of aspects 15-18, wherein establishing the network connection further comprises: determining, by the modem, a first data network name and a first network slice associated with the route identifier; and establishing a protocol data unit (PDU) session associated with the first DNN via the first network slice.

20. The method of any of aspects 15-19, further comprising storing an index mapping the network route to the generated route identifier, wherein the route identifier is a random string of one or more values.

21. The method of any of aspects 15-20, wherein the traffic descriptor is added to the request for route identifier by the OS.

22. The method of any of aspects 15-21, wherein the start network request originates from the first application, the method further comprising: receiving, by the OS, the start network request from the first application; in response to receiving the start network request, determining whether an existing network connection corresponding to the route identifier is available; when the existing network connection is available, enabling, by the OS, the first application for communication over the existing network connection; and when the existing network connection is not available, transmitting the start network request to the modem.

23. The method of any of aspects 15-22, further comprising notifying the OS, by the modem, that the network connection has been established.

24. A user equipment (UE), comprising: a memory; a modem; and a processor coupled to the memory and the modem, the memory and the processor being configured to: transmit, from an operating system (OS) executing on the processor to the modem, an indication of a start network request originating from an application executing on the OS, the indication being transmitted based on a determination that a traffic descriptor associated with the application is a non-default descriptor; determine one or more parameters for establishing a new network connection for the application, the one or more parameters determined based on a routing policy that provides mapping between the traffic descriptor and the one or more parameters; and transmit, to the application, an indication that the new network connection has been established based on the one or more parameters.

25. The UE of aspect 24, wherein the memory and the processor are further configured to receive, from the modem, an application descriptor list comprising one or more traffic descriptors that are non-default descriptors, the one or more traffic descriptors comprising an application identifier associated with the application, wherein any traffic descriptor not on the application descriptor list is a default descriptor.

26. The UE of any of aspects 24 and 25, wherein the default descriptor is associated with a first DNN and a first network slice, wherein the non-default descriptor is associated with the first DNN and a second network slice, and wherein the default descriptor is a default descriptor for the first DNN.

27. The UE of any of aspects 24-26, and wherein the non-default descriptor indicates that the application communicates via the second network slice.

28. The UE of any of aspects 24-27, wherein the one or more parameters comprise one or more of a data network name (DNN) or a network slice, wherein each of the DNN and the network slice are associated with the traffic descriptor.

29. The UE of any of aspects 24-28, wherein the memory and the processor are further configured to transmit, to the modem, a command to establish the new network connection, the command comprising the one or more parameters.

30. The UE of any of aspects 24-29, wherein the memory and the processor are further configured to receive, from the modem, the indication that the new network connection has been established, wherein the memory and the processor, being configured to transmit the indication to the application, are further configured to transmit the indication to the application in response to receiving the indication from the modem.

31. An apparatus comprising means for performing the method of any of aspects 1 through 23.

32. An apparatus comprising at least one processor and a memory coupled to the at least one processor, the memory comprising code executable by the at least one processor to cause the apparatus to perform the method of any of aspects 1 through 23.

33. A computer readable medium storing computer executable code thereon for wireless communications that, when executed by at least one processor, cause an apparatus to perform the method of any of aspects 1 through 23.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1, e.g., "user equipment (UE)"), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication at a user equipment (UE), comprising:
  receiving, by a modem, from an operating system (OS), a request for route identifier, the request for route identifier comprising a traffic descriptor corresponding to a first application from which the request for route identifier originated;
  transmitting a route identifier to the OS, the route identifier generated by the modem based on a routing policy that provides mapping between the traffic descriptor and a network route, wherein the routing policy provides mapping between each of a plurality of traffic descriptors and a corresponding network route, and wherein each corresponding network route comprises a data network name (DNN) and an indication of a network slice;

receiving, by the modem, a start network request comprising the route identifier; and establishing, in response to the start network request, a network connection via the network route.

2. The method of claim 1, wherein a first traffic descriptor of the plurality of traffic descriptors is associated with a first DNN and a first network slice, wherein a second traffic descriptor of the plurality of traffic descriptors is associated with the first DNN and a second network slice, and wherein the first traffic descriptor is a default descriptor for the first DNN.

3. The method of claim 2, wherein the transmitting the route identifier to the OS indicates that the first application has permission from the modem to communicate via the second network slice.

4. The method of claim 1, wherein establishing the network connection further comprises:

determining, by the modem, a first data network name and a first network slice associated with the route identifier; and establishing a protocol data unit (PDU) session associated with the first DNN via the first network slice.

5. The method of claim 1, further comprising storing an index mapping the network route to the route identifier, wherein the route identifier is a random string of one or more values.

6. The method of claim 1, wherein the traffic descriptor is added to the request for route identifier by the OS.

7. The method of claim 1, wherein the start network request originates from the first application, the method further comprising:

receiving, by the OS, the start network request from the first application;

in response to receiving the start network request, determining whether an existing network connection corresponding to the route identifier is available;

when the existing network connection is available, enabling, by the OS, the first application for communication over the existing network connection; and when the existing network connection is not available, transmitting the start network request to the modem.

8. The method of claim 1, further comprising notifying the OS, by the modem, that the network connection has been established.

9. A user equipment (UE), comprising:

a memory;

a modem; and a processor coupled to the memory and the modem, the memory and the processor being configured to:

receive, via a modem, from an operating system (OS), a request for route identifier, the request for route identifier comprising a traffic descriptor corresponding to a first application from which the request for route identifier originated;

transmit a route identifier to the OS, the route identifier generated by the modem based on a routing policy that provides mapping between the traffic descriptor and a network route, wherein the routing policy provides mapping between each of a plurality of traffic descriptors and a corresponding network route, and wherein each corresponding network route comprises a data network name (DNN) and an indication of a network slice;

receive, via the modem, a start network request comprising the route identifier; and establish, in response to the start network request, a network connection via the network route.

10. The UE of claim 9, wherein a first traffic descriptor of the plurality of traffic descriptors is associated with a first DNN and a first network slice, wherein a second traffic descriptor of the plurality of traffic descriptors is associated with the first DNN and a second network slice, and wherein the first traffic descriptor is a default descriptor for the first DNN.

11. The UE of claim 10, wherein the memory and the processor are further configured to transmit the route identifier to the OS indicates that the first application has permission from the modem to communicate via the second network slice.

12. The UE of claim 9, wherein the memory and the processor configured to establish the network connection is further configured to:

determine, by the modem, a first data network name and a first network slice associated with the route identifier; and establish a protocol data unit (PDU) session associated with the first DNN via the first network slice.

13. The UE of claim 9, wherein the memory and the processor are further configured to store an index mapping the network route to the route identifier, wherein the route identifier is a random string of one or more values.

14. The UE of claim 9, wherein the traffic descriptor is added to the request for route identifier by the OS.

15. The UE of claim 9, wherein the start network request originates from the first application, and the memory and the processor are further configured to:

receive, via the OS, the start network request from the first application;

in response to receiving the start network request, determine whether an existing network connection corresponding to the route identifier is available;

when the existing network connection is available, enable, via the OS, the first application for communication over the existing network connection; and when the existing network connection is not available, transmit the start network request to the modem.

16. The UE of claim 9, wherein the memory and the processor are further configured to notify the OS, via the modem, that the network connection has been established.

17. A non-transitory computer-readable storage medium that stores instructions that, when executed by a processor of a user equipment (UE), cause the UE to perform a method of wireless communication, the method comprising:

receiving, by a modem, from an operating system (OS), a request for route identifier, the request for route identifier comprising a traffic descriptor corresponding to a first application from which the request for route identifier originated;

transmitting a route identifier to the OS, the route identifier generated by the modem based on a routing policy that provides mapping between the traffic descriptor and a network route, wherein the routing policy provides mapping between each of a plurality of traffic descriptors and a corresponding network route, and wherein each corresponding network route comprises a data network name (DNN) and an indication of a network slice;

receiving, by the modem, a start network request comprising the route identifier; and establishing, in response to the start network request, a network connection via the network route.

18. A method for wireless communication at a user equipment (UE), comprising:

receiving, by a modem, from an operating system (OS), a request for route identifier, the request for route identifier comprising a traffic descriptor corresponding to a first application from which the request for route identifier originated;

transmitting a route identifier to the OS, the route identifier generated by the modem based on a routing policy that provides mapping between the traffic descriptor and a network route;

receiving, by the modem, a start network request comprising the route identifier; and establishing, in response to the start network request, a network connection via the network route, wherein establishing the network connection comprises:
  determining, by the modem, a first data network name and a first network slice associated with the route identifier; and
  establishing a protocol data unit (PDU) session associated with the first DNN via the first network slice.

19. A user equipment (UE), comprising:
a memory;
a modem; and
a processor coupled to the memory and the modem, the memory and the processor being configured to:
  receive, via a modem, from an operating system (OS), a request for route identifier, the request for route identifier comprising a traffic descriptor corresponding to a first application from which the request for route identifier originated;
  transmit a route identifier to the OS, the route identifier generated by the modem based on a routing policy that provides mapping between the traffic descriptor and a network route;
  receive, via the modem, a start network request comprising the route identifier; and
  establish, in response to the start network request, a network connection via the network route, wherein the memory and the processor configured to establish the network connection is further configured to:
    determine, by the modem, a first data network name and a first network slice associated with the route identifier; and
    establish a protocol data unit (PDU) session associated with the first DNN via the first network slice.

20. A non-transitory computer-readable storage medium that stores instructions that, when executed by a processor of a user equipment (UE), cause the UE to perform a method of wireless communication, the method comprising:
receiving, by a modem, from an operating system (OS), a request for route identifier, the request for route identifier comprising a traffic descriptor corresponding to a first application from which the request for route identifier originated;

transmitting a route identifier to the OS, the route identifier generated by the modem based on a routing policy that provides mapping between the traffic descriptor and a network route;

receiving, by the modem, a start network request comprising the route identifier; and establishing, in response to the start network request, a network connection via the network route, wherein establishing the network connection comprises:
  determining, by the modem, a first data network name and a first network slice associated with the route identifier; and
  establishing a protocol data unit (PDU) session associated with the first DNN via the first network slice.

* * * * *